(12) United States Patent
Zuo et al.

(10) Patent No.: US 12,266,964 B2
(45) Date of Patent: *Apr. 1, 2025

(54) CHARGING-AND-DISCHARGING APPARATUS, METHOD FOR CHARGING A BATTERY AND CHARGING-AND-DISCHARGING SYSTEM

(71) Applicant: CONTEMPORARY AMPEREX TECHNOLOGY (HONG KONG) LIMITED, Hong Kong (CN)

(72) Inventors: Xiyang Zuo, Ningde (CN); Yu Yan, Ningde (CN); Jinfeng Gao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 382 days.

This patent is subject to a terminal disclaimer.

(21) Appl. No.: 17/565,044

(22) Filed: Dec. 29, 2021

(65) Prior Publication Data
US 2023/0036620 A1 Feb. 2, 2023

Related U.S. Application Data

(63) Continuation of application No. PCT/CN2021/109373, filed on Jul. 29, 2021.

(51) Int. Cl.
*H02J 7/00* (2006.01)
*B60L 50/60* (2019.01)
(Continued)

(52) U.S. Cl.
CPC .......... *H02J 7/00714* (2020.01); *B60L 50/60* (2019.02); *B60L 58/12* (2019.02); *H01M 10/425* (2013.01);
(Continued)

(58) Field of Classification Search
CPC .. H02J 7/00714; H02J 7/0048; H01M 10/425; B60L 50/60; B60L 58/12
(Continued)

(56) References Cited

U.S. PATENT DOCUMENTS 4,691,158 A * 9/1987 Hashimoto ........... H01M 10/44
324/430
4,829,225 A * 5/1989 Podrazhansky ...... H02J 7/00711
320/129
(Continued)

FOREIGN PATENT DOCUMENTS

CN 201663206 U 12/2010
CN 106160144 A 11/2016
(Continued)

OTHER PUBLICATIONS

Tan, K. et al., "Three-Phase Bidirectional Electric Vehicle Charger for Vehicle to Grid Operation and Grid Voltage Regulation", 2016 IEEE Transportation Electrification Conference and Expo, Jun. 1, 2016, pp. 7-12.
(Continued)

*Primary Examiner* — John T Trischler
(74) *Attorney, Agent, or Firm* — Scully, Scott, Murphy & presser, P.C.

(57) ABSTRACT

A charging/discharging apparatus, a method for charging a battery and a charging/discharging system, the charging-and-discharging apparatus including a bidirectional AC/DC converter, a first DC/DC converter, and a control unit, where the first DC/DC converter is a bidirectional DC/DC converter; and where the control unit is configured to: receive a first charging current sent by a BMS of a battery, control the bidirectional AC/DC converter and the first DC/DC converter according to the first charging current to charge the battery through an AC power; receive a first discharging current sent by the BMS and discharging a power of the
(Continued)

battery according to the first discharging current; and receiving a second charging current sent by the BMS and control the bidirectional AC/DC converter and the first DC/DC converter according to the second charging current to charge the battery through the AC power.

17 Claims, 13 Drawing Sheets

(51) Int. Cl.
| | |
|---|---|
| *B60L 58/12* | (2019.01) |
| *H01M 10/42* | (2006.01) |
| *B60L 55/00* | (2019.01) |
| *B60L 58/13* | (2019.01) |
| *H02J 3/32* | (2006.01) |

(52) U.S. Cl.
CPC ............. *H02J 7/0048* (2020.01); *B60L 55/00* (2019.02); *B60L 58/13* (2019.02); *B60L 2210/10* (2013.01); *B60L 2210/30* (2013.01); *H01M 2010/4271* (2013.01); *H02J 3/322* (2020.01); *H02J 7/0069* (2020.01); *H02J 7/0071* (2020.01); *H02J 7/00712* (2020.01); *H02J 2207/20* (2020.01)

(58) Field of Classification Search
USPC ......................................................... 320/128
See application file for complete search history.

(56) References Cited

U.S. PATENT DOCUMENTS

| | | | | |
|---|---|---|---|---|
| 5,307,000 | A | 4/1994 | Podrazhansky et al. | |
| 6,232,750 | B1* | 5/2001 | Podrazhansky | H02J 7/00711 320/139 |
| 6,441,588 | B1* | 8/2002 | Yagi | B60L 58/27 320/150 |
| 6,919,648 | B2* | 7/2005 | Bolz | H02P 9/307 290/40 C |
| 6,977,448 | B2* | 12/2005 | Kanouda | H02J 9/061 307/64 |
| 7,157,810 | B2* | 1/2007 | Kanouda | H02J 9/061 307/66 |
| 7,436,080 | B2* | 10/2008 | Hackl | H02J 7/345 290/40 C |
| 7,456,519 | B2* | 11/2008 | Takeda | H02M 3/158 307/64 |
| 7,714,541 | B2* | 5/2010 | Stamos | H02J 7/007182 324/426 |
| 7,825,630 | B2* | 11/2010 | Stamos | H02J 7/007182 324/426 |
| 7,936,083 | B2* | 5/2011 | Stancu | H02M 1/10 307/9.1 |
| 8,497,686 | B2* | 7/2013 | Hoshino | G01R 31/392 320/132 |
| 8,552,590 | B2* | 10/2013 | Moon | H02J 3/32 307/64 |
| 8,558,510 | B2* | 10/2013 | Moon | H02J 3/144 320/140 |
| 8,581,551 | B2* | 11/2013 | Seo | G06F 1/26 320/101 |
| 8,788,110 | B2* | 7/2014 | Taima | B60L 53/14 700/297 |
| 8,860,252 | B2* | 10/2014 | Kang | H02J 3/32 307/46 |
| 8,860,363 | B2* | 10/2014 | Ang | B60L 1/02 320/132 |
| 8,963,499 | B2* | 2/2015 | Choi | H02J 7/0016 320/122 |
| 9,013,152 | B2* | 4/2015 | Kawamoto | H02J 3/322 320/134 |
| 9,041,354 | B2* | 5/2015 | Lee | H02J 7/35 320/140 |
| 9,093,908 | B2* | 7/2015 | Takegami | H02M 3/33584 |
| 9,124,103 | B2* | 9/2015 | Kawamoto | H02H 3/28 |
| 9,153,976 | B2* | 10/2015 | Kim | H02J 3/32 |
| 9,225,198 | B2* | 12/2015 | Ishida | B60L 3/12 |
| 9,493,092 | B2* | 11/2016 | Kondoh | B60L 15/00 |
| 9,496,742 | B2* | 11/2016 | Suga | H02J 7/00302 |
| 9,660,305 | B2* | 5/2017 | Hatta | H01M 10/46 |
| 9,673,639 | B2* | 6/2017 | Okuda | H02J 7/0013 |
| 9,726,554 | B1* | 8/2017 | Ghantous | G01K 15/00 |
| 9,742,206 | B2* | 8/2017 | Ohtsuki | H02J 7/0016 |
| 10,014,717 | B2* | 7/2018 | Wang | H02J 9/061 |
| 10,040,363 | B2* | 8/2018 | Beaston | H02J 3/322 |
| 10,090,695 | B2* | 10/2018 | Card | H02J 7/00711 |
| 10,110,023 | B2* | 10/2018 | Magagnin | H02J 7/0068 |
| 10,122,042 | B2* | 11/2018 | Krasovitsky | H02J 7/007182 |
| 10,164,436 | B2* | 12/2018 | Takenaka | H01M 10/465 |
| 10,291,037 | B2* | 5/2019 | Birkl | H02J 7/00041 |
| 10,326,176 | B2* | 6/2019 | Wang | B60L 3/12 |
| 10,355,509 | B2* | 7/2019 | Sada | H02J 3/003 |
| 10,355,611 | B2* | 7/2019 | Nagashima | B60L 55/00 |
| 10,365,334 | B2* | 7/2019 | Miyamoto | G01R 31/36 |
| 10,406,927 | B2* | 9/2019 | Baba | H02J 3/38 |
| 10,569,659 | B2* | 2/2020 | Tsuno | B60L 55/00 |
| 10,594,150 | B2* | 3/2020 | Magagnin | H02J 7/0014 |
| 10,601,070 | B2* | 3/2020 | Krasovitsky | H01M 10/0525 |
| 10,658,851 | B2* | 5/2020 | Liu | H02J 7/02 |
| 10,725,111 | B2* | 7/2020 | Kawahara | H01M 10/482 |
| 10,903,674 | B2* | 1/2021 | Wen | H02J 7/02 |
| 10,913,371 | B2* | 2/2021 | Baba | B60L 53/305 |
| 10,958,098 | B1* | 3/2021 | Li | H02J 9/062 |
| 11,007,891 | B1* | 5/2021 | Kamal | H02J 13/00002 |
| 11,043,821 | B2* | 6/2021 | Nishikawa | H02J 7/0013 |
| 11,088,402 | B2* | 8/2021 | Krasovitsky | H02J 7/007 |
| 11,127,538 | B2* | 9/2021 | Samuilov | H01G 11/76 |
| 11,139,657 | B2* | 10/2021 | Nakajima | H02J 3/381 |
| 11,183,847 | B2* | 11/2021 | Gohla-Neudecker | B60L 53/11 |
| 11,251,714 | B1* | 2/2022 | Gao | H02J 7/02 |
| 11,270,243 | B1* | 3/2022 | Roy | B60L 53/67 |
| 11,283,277 | B2* | 3/2022 | Hino | H01M 50/204 |
| 11,390,181 | B1* | 7/2022 | Clark | B60L 58/21 |
| 11,394,218 | B2* | 7/2022 | Onoda | H02J 3/38 |
| 11,462,933 | B2* | 10/2022 | Tagawa | H01M 10/44 |
| 11,495,966 | B2* | 11/2022 | Oomori | H02J 3/38 |
| 11,498,448 | B2* | 11/2022 | Van De Water | B60L 53/14 |
| 11,539,212 | B2* | 12/2022 | Xu | H02S 40/32 |
| 11,584,250 | B1* | 2/2023 | Palombini | B60L 53/305 |
| 11,594,883 | B2* | 2/2023 | Suzuki | H02J 7/00714 |
| 11,681,967 | B2* | 6/2023 | Roy | G06Q 10/0635 320/109 |
| 11,685,289 | B2* | 6/2023 | Gao | H02J 7/007182 701/22 |
| 11,721,494 | B2* | 8/2023 | Samuilov | H01G 11/76 361/502 |
| 11,769,094 | B2* | 9/2023 | Ayoola | B60L 53/62 320/109 |
| 11,799,304 | B2* | 10/2023 | Chung | H02J 7/0045 |
| 11,813,957 | B2* | 11/2023 | Cavedo, Jr. | H02J 7/0048 |
| 11,824,380 | B2* | 11/2023 | Xu | B60L 53/11 |
| 11,894,715 | B2* | 2/2024 | Go | H02J 7/0013 |
| 11,894,717 | B2* | 2/2024 | Fukano | H02J 1/106 |
| 11,909,244 | B2* | 2/2024 | Li | H01M 4/587 |
| 11,923,712 | B2* | 3/2024 | Li | H02J 7/0068 |
| 11,942,812 | B2* | 3/2024 | Lee | H02J 7/007 |
| 2002/0070710 | A1* | 6/2002 | Yagi | B60L 58/27 320/150 |
| 2002/0186576 | A1* | 12/2002 | Kanouda | H02J 9/061 363/125 |
| 2003/0184937 | A1* | 10/2003 | Kanouda | H02J 9/061 361/90 |
| 2004/0112320 | A1* | 6/2004 | Bolz | H02J 7/1423 290/31 |
| 2004/0145926 | A1* | 7/2004 | Kanouda | H02J 9/061 363/61 |
| 2006/0023478 | A1* | 2/2006 | Takeda | H02J 9/062 363/97 |

(56) References Cited

U.S. PATENT DOCUMENTS

| | | | | |
|---|---|---|---|---|
| 2006/0145536 A1* | 7/2006 | Hackl | H02J 7/1423 | 307/10.1 |
| 2009/0001927 A1* | 1/2009 | Stamos | H02J 7/0071 | 340/636.2 |
| 2009/0086520 A1* | 4/2009 | Nishimura | H02M 3/33576 | 363/133 |
| 2009/0278405 A1* | 11/2009 | Stancu | H02M 1/10 | 29/592.1 |
| 2010/0214108 A1* | 8/2010 | Stamos | H02J 7/005 | 320/132 |
| 2011/0050239 A1* | 3/2011 | Hoshino | G06Q 30/06 | 324/435 |
| 2011/0115295 A1* | 5/2011 | Moon | H02J 3/32 | 307/65 |
| 2011/0140667 A1* | 6/2011 | Moon | H02J 7/0071 | 320/134 |
| 2011/0148195 A1* | 6/2011 | Lee | H02J 7/35 | 307/25 |
| 2011/0148360 A1* | 6/2011 | Lee | H02J 9/062 | 307/66 |
| 2011/0175565 A1* | 7/2011 | Lee | H02J 3/32 | 320/101 |
| 2012/0043819 A1* | 2/2012 | Kang | H02J 3/32 | 320/128 |
| 2012/0086399 A1* | 4/2012 | Choi | H02J 7/0029 | 320/116 |
| 2012/0091965 A1* | 4/2012 | Seo | H02J 7/342 | 320/128 |
| 2012/0091967 A1* | 4/2012 | Kawamoto | H02J 3/322 | 320/134 |
| 2012/0173034 A1* | 7/2012 | Taima | B60L 53/64 | 700/295 |
| 2012/0274268 A1* | 11/2012 | Ishida | B60L 3/12 | 320/107 |
| 2012/0326531 A1* | 12/2012 | Kawamoto | H02J 7/0031 | 307/130 |
| 2013/0110337 A1* | 5/2013 | Kondoh | B60L 58/20 | 701/22 |
| 2013/0200846 A1* | 8/2013 | Ang | B60L 1/003 | 320/109 |
| 2013/0278214 A1* | 10/2013 | Satoh | B60L 58/15 | 320/109 |
| 2013/0322128 A1* | 12/2013 | Takegami | H02M 3/33507 | 363/17 |
| 2014/0162091 A1* | 6/2014 | Hatta | H02J 3/32 | 429/50 |
| 2014/0210417 A1* | 7/2014 | Kim | H02J 7/0071 | 320/136 |
| 2014/0225570 A1* | 8/2014 | Suga | H01M 10/42 | 320/134 |
| 2014/0312841 A1* | 10/2014 | Baba | B60L 55/00 | 320/109 |
| 2014/0320087 A1* | 10/2014 | Takahashi | H01M 10/443 | 320/134 |
| 2015/0097429 A1* | 4/2015 | Takenaka | H02J 7/35 | 320/101 |
| 2015/0280462 A1* | 10/2015 | Ohtsuki | H02J 7/0047 | 320/116 |
| 2015/0280463 A1* | 10/2015 | Okuda | H02J 7/0013 | 320/112 |
| 2015/0303731 A1* | 10/2015 | Takahashi | H02J 7/00 | 320/161 |
| 2016/0064957 A1* | 3/2016 | Card | H02J 7/0071 | 320/129 |
| 2016/0114693 A1* | 4/2016 | Tsuno | H02J 7/00036 | 320/134 |
| 2016/0248126 A1* | 8/2016 | Wang | G01R 31/374 | |
| 2016/0285307 A1* | 9/2016 | Wang | H02J 9/061 | |
| 2016/0315485 A1* | 10/2016 | Magagnin | H02J 7/0013 | |
| 2017/0047745 A1* | 2/2017 | Chambon | G01R 31/367 | |
| 2017/0106764 A1* | 4/2017 | Beaston | B60L 58/12 | |
| 2017/0131360 A1* | 5/2017 | Kawahara | G01R 31/3648 | |
| 2017/0214266 A1* | 7/2017 | Takahashi | G01R 31/392 | |
| 2017/0310120 A1 | 10/2017 | Birkl et al. | | |
| 2017/0338668 A1* | 11/2017 | Sada | H02J 3/32 | |
| 2017/0355269 A1* | 12/2017 | An | B60L 58/20 | |
| 2018/0128880 A1* | 5/2018 | Miyamoto | H02J 7/007 | |
| 2018/0198161 A1* | 7/2018 | Krasovitsky | H01M 10/0525 | |
| 2018/0287390 A1* | 10/2018 | Nakajima | H02J 7/35 | |
| 2018/0301749 A1* | 10/2018 | Krasovitsky | H01M 10/04 | |
| 2018/0351374 A1* | 12/2018 | Liu | H02J 7/00 | |
| 2018/0366968 A1* | 12/2018 | Magagnin | H02J 7/0025 | |
| 2019/0074711 A1* | 3/2019 | Go | H02J 7/35 | |
| 2019/0366871 A1* | 12/2019 | Baba | H02J 3/322 | |
| 2019/0372465 A1* | 12/2019 | Xu | H02J 7/02 | |
| 2020/0001730 A1* | 1/2020 | Gohla-Neudecker | B60L 53/11 | |
| 2020/0006013 A1* | 1/2020 | Samuilov | H01G 11/10 | |
| 2020/0106138 A1* | 4/2020 | Wang | B60L 58/21 | |
| 2020/0119411 A1* | 4/2020 | Krasovitsky | H02J 7/005 | |
| 2020/0161875 A1* | 5/2020 | Nishikawa | H02J 3/32 | |
| 2020/0169217 A1* | 5/2020 | Oomori | H02M 3/155 | |
| 2020/0195148 A1* | 6/2020 | Wen | H02J 7/02 | |
| 2020/0235587 A1* | 7/2020 | Hino | H01M 10/425 | |
| 2020/0259360 A1* | 8/2020 | Tagawa | H01M 10/0525 | |
| 2020/0366236 A1* | 11/2020 | Xu | H02J 3/32 | |
| 2020/0398693 A1* | 12/2020 | Haraguchi | H02J 13/00006 | |
| 2021/0066929 A1* | 3/2021 | Suzuki | H02J 3/38 | |
| 2021/0078435 A1* | 3/2021 | Van De Water | H02J 3/322 | |
| 2021/0104910 A1* | 4/2021 | Li | H02J 9/061 | |
| 2021/0152010 A1* | 5/2021 | Nagai | B60L 58/12 | |
| 2021/0383983 A1* | 12/2021 | Samuilov | H01G 11/76 | |
| 2022/0037898 A1* | 2/2022 | Onoda | H02J 3/32 | |
| 2022/0085641 A1* | 3/2022 | Hirota | B60L 50/60 | |
| 2022/0200303 A1* | 6/2022 | Swamy | H02J 7/0013 | |
| 2022/0209543 A1* | 6/2022 | Lee | B60L 53/22 | |
| 2022/0239135 A1* | 7/2022 | Li | H02J 7/06 | |
| 2022/0247206 A1* | 8/2022 | Fukano | H02J 9/061 | |
| 2022/0255336 A1* | 8/2022 | Li | H01M 10/44 | |
| 2022/0261715 A1* | 8/2022 | Roy | H02J 3/32 | |
| 2022/0396167 A1* | 12/2022 | Sharifipour | B60L 53/22 | |
| 2023/0014801 A1* | 1/2023 | Chung | H01M 10/46 | |
| 2023/0019914 A1* | 1/2023 | Ehara | H02J 3/003 | |
| 2023/0024900 A1* | 1/2023 | Ayoola | B60L 55/00 | |
| 2023/0029492 A1* | 2/2023 | Zuo | H01M 10/425 | |
| 2023/0031352 A1* | 2/2023 | Yan | H02J 7/0071 | |
| 2023/0034292 A1* | 2/2023 | Zuo | B60L 55/00 | |
| 2023/0035744 A1* | 2/2023 | Gao | B60L 53/53 | |
| 2023/0089072 A1* | 3/2023 | Sahoo | H02M 7/797 | 363/37 |
| 2023/0095057 A1* | 3/2023 | Xu | H02J 3/32 | 323/221 |
| 2023/0163603 A1* | 5/2023 | Cavedo, Jr. | H02J 7/0013 | 320/107 |
| 2023/0163620 A1* | 5/2023 | Cavedo, Jr. | H02J 7/0029 | 320/103 |
| 2023/0231218 A1* | 7/2023 | Li | H01M 10/625 | 429/62 |
| 2023/0249577 A1* | 8/2023 | Cavedo, Jr. | H02J 7/0048 | |
| 2023/0291219 A1* | 9/2023 | Li | H01M 10/48 | |
| 2023/0299606 A1* | 9/2023 | Zuo | H02J 7/0048 | 320/137 |
| 2023/0387812 A1* | 11/2023 | Schulz | B60L 53/302 | |
| 2023/0411969 A1* | 12/2023 | Gupta | H01M 10/659 | |
| 2024/0010103 A1* | 1/2024 | Li | B60L 58/27 | |
| 2024/0022107 A1* | 1/2024 | Cavedo, Jr. | H02J 7/0029 | |

FOREIGN PATENT DOCUMENTS

| | | |
|---|---|---|
| CN | 207968040 U | 10/2018 |
| CN | 110661314 A | 1/2020 |
| CN | 111969263 A | 11/2020 |
| EP | 3204998 A1 | 8/2017 |
| JP | H07502146 A | 3/1995 |
| JP | 2018152928 A * | 9/2018 |
| JP | 2019050713 A | 3/2019 |
| JP | 2019129555 A | 8/2019 |
| JP | 2021093788 A | 6/2021 |

(56) References Cited

FOREIGN PATENT DOCUMENTS

| | | |
|---|---|---|
| KR | 101736008 B1 | 5/2017 |
| WO | 1993015543 A1 | 8/1993 |
| WO | 2016055806 A1 | 4/2016 |

OTHER PUBLICATIONS

Extended European Search Report dated Oct. 5, 2022 received in European Patent Application No. EP 21820434.5.
Notice of Reasons for Refusal dated Oct. 10, 2023 received in Japanese Patent Application No. JP 2021-576109.
Request for the Submission of an Opinion dated Aug. 7, 2023 received in Korean Patent Application No. KR 10-2021-7039407.

\* cited by examiner

CHARGING-AND-DISCHARGING APPARATUS, METHOD FOR CHARGING A BATTERY AND CHARGING-AND-DISCHARGING SYSTEM

CROSS-REFERENCE TO RELATED APPLICATIONS

This application is a continuation of International Application No. PCT/CN2021/109373, filed on Jul. 29, 2021, the disclosure of which is hereby incorporated by reference in its entirety.

TECHNICAL FIELD

The present application relates to the field of batteries and in particular, relates to a charging-and-discharging apparatus, a method for charging a battery and a charging-and-discharging system.

BACKGROUND

Along with the development of the times, due to the advantages of high environmental friendliness, low noise, low use cost and the like, the electric vehicle has a huge market prospect, can effectively promote energy conservation and emission reduction, and is beneficial to the development and progress of the society.

For the electric vehicles and related fields thereof, the battery technology is an important factor related to the development of the electric vehicles, in particular, the safety performance of the battery influences the development and application of battery related products, and influences the acceptance of the public for the electric vehicles. Hence, how to guarantee the safety performance of the battery is a to-be-solved technical problem.

SUMMARY

Embodiments of the present application provide a charging-and-discharging apparatus, a method for charging a battery and a charging-and-discharging system, and the safety performance of the battery can be guaranteed.

According to a first aspect, a charging-and-discharging apparatus is provided, including: a bidirectional AC/DC converter, a first DC/DC converter, and a control unit, where the first DC/DC converter is a bidirectional DC/DC converter; and where the control unit is configured to: receive a first charging current sent by a BMS of a battery and control the bidirectional AC/DC converter and the first DC/DC converter according to the first charging current to charge the battery through an AC power; receive a first discharging current sent by the BMS and discharge a power of the battery according to the first discharging current, where the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and receive a second charging current sent by the BMS and control the bidirectional AC/DC converter and the first DC/DC converter according to the second charging current to charge the battery through the AC power, where the second charging current is a charging current sent by the BMS when a first accumulative discharging amount of the battery is greater than or equal to a first accumulative discharging amount threshold.

Based on some embodiments, in the process of charging the battery, the control unit charge and discharge the battery alternatively based on the first charging current and the first discharging current sent by the BMS by controlling the AC/DC converter and first DC/DC converter. Thus, heating, lithium-ion clustering and other problems caused by continuous charging of the battery can be avoided. Further, security problems of the battery caused by heating, lithium-ion clustering and other problems can be avoided, such as combustion or explosion of the battery, so as to ensure security performance of the battery.

In some embodiments, the control unit is further configured to: receive a second discharging current sent by the BMS and discharge a power of the battery according to the second discharging current, where the second discharging current is a discharging current sent by the BMS when a second accumulative charging amount of the battery is greater than or equal to a second accumulative charging amount threshold and a voltage of a battery cell of the battery does not exceed a full-charging voltage of the battery cell.

In some embodiments, through information interaction between the BMS and the charging-and-discharging apparatus, after the completion of charging, discharging and recharging of the battery, the battery may be further discharged again. In this way, a multi-cycle of charging-and-discharging method can be further provided, charging and discharging processes are sequentially and cyclically implemented to achieve gradually charging of the battery on the basis of ensuring the performance of the battery.

In some embodiments, the control unit is further configured to: receive a charging stop command sent by the BMS and stope charging the battery according to the charging stop command, where the charging stop command is a command sent by the BMS when a voltage of a battery cell of the battery exceeds a full-charging voltage of the battery cell.

In some embodiments, a charging rate of the first charging current and/or the second charging current ranges between 2 C and 10 C.

In some embodiments, on the basis of guaranteeing the safety performance of the battery, the charging rate of the first charging current and/or the second charging current ranges from 2 C to 10 C, so that high-current quick charging may be achieved to increase the charging amount of the battery during a single charging process and to achieve quick charging.

In addition, due to the limitation that lithium ions are gathered at a negative electrode in the continuous charging process, the charging current is also limited, and thus quick charging of the battery cannot be achieved by using continuous high current; however, in the embodiment, the battery is charged by using the high current, and the battery is discharged after one-time high-current charging to release the lithium ions gathered at the negative electrode of the battery in the charging process, and then the battery may be subsequently charged by utilizing the high current again, thus achieving quick charging of the battery.

In some embodiments, a discharging rate of the first discharging current ranges between 0.1 C and 1 C.

In some embodiments, the discharging rate of the first discharging current ranges from 0.1 C to 1 C to achieve low-current discharging, which aims at releasing the lithium ions gathered at the negative electrode of the battery through low-current discharging of the battery without causing excessive loss of charged electric amount in the battery.

In some embodiments, a ratio of the first accumulative discharging amount threshold to the first accumulative charging amount threshold is less than or equal to 10%.

In some embodiments, the charging amount of the battery in the charging process and the discharging amount of the battery in the discharging process may be better controlled by setting a ratio of an accumulated discharging amount threshold value in the discharging process to an accumulated discharging amount threshold value in the charging process such that the discharging amount is relatively low, and the excessive loss of the charged electric amount in the battery is avoided.

In some embodiments, at least one of the first charging current, the first discharging current and the second charging current is determined and acquired by the BMS according to a state parameter of the battery; where the state parameter of the battery includes at least one of the following parameters: a battery temperature, a battery voltage, a battery current, a state of charge and a battery health state.

In some embodiments, at least one of the first charging current, the second charging current and the first discharging current is the current determined according to the state parameter of the battery, which may be better adapted to the current state parameter of the battery to improve the charging efficiency and/or discharging efficiency of the battery without damaging the battery.

In some embodiments, the control unit is configured to: regularly receiving the first charging current sent by the BMS; and/or regularly receiving the first discharging current sent by the BMS; and/or regularly receiving the second charging current sent by the BMS.

In some embodiments, in the process that the charging-and-discharging apparatus performs a single charging and/or a single discharging on the battery, the charging current and/or discharging current is sent by the BMS regularly. On the one hand, the charging current and/or discharging current may be adjusted regularly to improve the charging and discharging efficiency, and on the other hand, the regularly sent charging current and/or the discharging current may be used for the charging-and-discharging apparatus to indicate that the states of the BMS and the battery are normal, so as to facilitate the charging-and-discharging apparatus to continuously charge the battery or control the discharging of the battery to guarantee the safety performance of the battery.

In some embodiments, the control unit is further configured to: receive a first charging voltage sent by the BMS, where the first charging voltage and the first charging current are carried in a first BCL message; and/or receive a first discharging voltage sent by the BMS, where the first discharging voltage and the first discharging current are carried in a second BCL message; and/or receive a second charging voltage sent by the BMS, where the second charging voltage and the second charging current are carried in a third BCL message.

In the embodiment, the communication between the BMS and the charging-and-discharging apparatus may be compatible with a communication protocol between an existing charger and the BMS. Thus, in this way, methods in various embodiments of the present application are easier to implement and promising for application.

In a possible implementation, the charging-and-discharging apparatus further includes a second DC/DC converter, one end of the second DC/DC converter is connected between the first DC/DC converter and the battery, and the other end of the second DC/DC converter is connected to an energy storage unit; where the control unit is specifically configured to: control the bidirectional AC/DC converter and the first DC/DC converter according to the first discharging current to discharge the battery capacity of the battery to the AC power; and control the second DC/DC converter to simultaneously discharge the battery capacity of the battery to the energy storage unit.

In the embodiment, the charging-and-discharging apparatus further includes a second DC/DC converter connected to an energy storage unit, the battery can discharge its power to an AC power and/or the energy storage unit, thereby improving an output capability of the charging-and-discharging apparatus, more effectively charging and discharging the battery alternatively and avoiding the problems of the battery such as heating, lithium ion aggregation, and the like, caused by continuous charging, and then avoiding the safety problems of the battery, such as battery combustion or explosion, caused by heating, lithium ion aggregation, and the like, so that the safety performance of the battery is guaranteed.

In a possible implementation, the control unit is specifically configured to: when a discharging demand power of the battery is greater than a maximum input power of the bidirectional AC/DC converter, control the bidirectional AC/DC converter and the first DC/DC converter according to the first discharging request to discharge the battery capacity of the battery to the AC power; and control the second DC/DC converter to simultaneously discharge the battery capacity of the battery to the energy storage unit.

A power of the battery for discharging to the AC power is equal to a maximum input power of the bidirectional AC/DC converter; and a power of the battery for discharging to the energy storage unit is equal to a difference between a discharging demand power of the battery and a maximum input power of the bidirectional AC/DC converter.

In some embodiments, the control unit is further configured to: when a discharging demand power of the battery is less than a maximum input power of the bidirectional AC/DC converter, controlling the bidirectional AC/DC converter and the first DC/DC converter according to the first discharging current to discharge the power of the battery to the AC power.

In some embodiments, the power of the battery is discharged to the AC power. When the discharging demand power of the battery is greater than the maximum input power of the bidirectional AC/DC converter, the power of the battery is simultaneously discharged to the AC power and the energy storage unit; and when the discharging demand power of the battery is less than the maximum input power of the bidirectional AC/DC converter, the power of the battery is only discharged to the AC power. By the reasonable distribution of the power discharged by the battery, unnecessary power consumption in the charging-and-discharging apparatus can be reduced.

In some embodiments, the control unit is specifically configured to: when a discharging demand power of the battery is greater than a maximum input power of the second DC/DC converter, controlling the second DC/DC converter according to the first discharging current to discharge the power of the battery to the energy storage unit; and control the first DC/DC converter and the bidirectional AC/DC converter to simultaneously discharge the power of the battery to the AC power.

A power of the battery for discharging to the energy storage unit is equal to a maximum input power of the second DC/DC converter and a power of the battery for discharging to the AC power is equal to a difference between a discharging demand power of the battery and a maximum input power of the second DC/DC converter.

In some embodiments, the control unit is further configured to: when a discharging demand power of the battery is less than a maximum input power of the second DC/DC converter, controlling the first DC/DC converter and the second DC/DC converter according to the first discharging current to discharge the power of the battery to the energy storage unit.

In some embodiments, the power of the battery is to the energy storage unit. When a discharging demand power of the battery is greater than a maximum input power of the second DC/DC converter, the power of the battery is simultaneously discharged to the AC power; and when a discharging demand power of the battery is less than a maximum input power of the second DC/DC converter, the power of the battery is only discharged to the energy storage unit. By the reasonable distribution of the power discharged by the battery, unnecessary power consumption in the charging-and-discharging apparatus can be reduced.

In some embodiments, the second DC/DC converter is a bidirectional DC/DC converter and the control unit is specifically configured to: when a SOC of the energy storage unit is greater than a SOC threshold, control the bidirectional AC/DC converter and the first DC/DC converter according to the first charging current to charge the battery through the AC power; and control the second DC/DC converter to simultaneously charge the battery through the energy storage unit.

In some embodiments, the second DC/DC converter is configured as a bidirectional DC/DC converter, so that the charging-and-discharging apparatus can determine whether to use the energy storage unit to assist the AC power to charge the battery together according to the SOC of the energy storage unit, thereby improving charging efficiency of the charging-and-discharging apparatus when the power stored in the energy storage unit is sufficient.

In some embodiments, a power of the energy storage unit for charging to the battery is a maximum output power of the second DC/DC converter; and a power of the AC power for charging to the battery is a difference between a charging demand power of the battery and a maximum output power of the second DC/DC converter.

According to a second aspect, provided is a method for charging a battery, applied to a charging-and-discharging apparatus, the charging-and-discharging apparatus including a bidirectional AC/DC converter, a first DC/DC converter, and a control unit, where the first DC/DC converter is a bidirectional DC/DC converter; and the method includes: receiving a first charging current sent by a BMS of a battery and controlling the bidirectional AC/DC converter and the first DC/DC converter according to the first charging current to charge the battery through an AC power; receiving a first discharging current sent by the BMS and discharging a power of the battery according to the first discharging current, where the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and receiving a second charging current sent by the BMS and controlling the bidirectional AC/DC converter and the first DC/DC converter according to the second charging current to charge the battery through the AC power, where the second charging current is a charging current sent by the BMS when a first accumulative discharging amount of the battery is greater than or equal to a first accumulative discharging amount threshold.

According to a third aspect, provided is a charging-and-discharging apparatus, including a processor and a memory, where the memory is configured to store a computer program, and the processor is used for call the computer program to perform the method in the second aspect and any one of the possible implementations of the second aspect.

According to a fourth aspect, provided is a charging system, including the charging-and-discharging apparatus in the first aspect and any one of the possible implementations of the first aspect and a BMS.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The embodiments of the present application are further described in detail below in conjunction with the accompanying drawings and the embodiments. The following detailed description of the embodiments and the accompanying drawings serve to illustratively describe the principles of the present application, but are not intended to limit the scope of the present application, i.e., the present application is not limited to the described embodiments.

In the description of the present application, it should be noted that unless otherwise specified, "plurality" means two or more; orientation o positional relationships indicated by the terms "upper," "lower," "left," "right," "inner," "outer," and the like are only for convenience of description and simplification of description rather than indicating or implying that the referenced device or element must have a particular orientation, be constructed and operate in a particular orientation, and thus are not to be construed as limiting the present application. In addition, the terms "first, " "second," "third," and the like are used for descriptive purposes only and are not to be construed as indicating or implying relative importance.

In the field of new energy, a power battery may serve as a main power source of an electric device (e.g., vehicles, ships, or spacecrafts), and an energy storage battery may serve as a charge source of the electric device, and the importance of the power battery and the energy storage battery is self-evident. As an example rather than limitation, in some application scenes, the power battery may be a battery in the electric device, and the energy storage battery may be a battery in a charge device. For convenience of description, hereinafter, both the power battery and the energy storage battery may be collectively referred to as a battery.

At present, most batteries in the market are rechargeable storage batteries, and most commonly lithium batteries, such as lithium ion batteries, or lithium ion polymer batteries, and the like. In the charging process, a battery is generally charged in a continuous charging mode, and the continuous charging of the battery may cause lithium precipitation, heating and other phenomena of the battery, where the lithium precipitation, heating and other phenomena can not only reduce the performance of the battery and greatly shorten the cycle life, but also can limit the quick charge capacity of the battery, and possibly cause catastrophic consequences such as combustion and explosion, resulting in serious safety problems.

To guarantee the safety performance of the battery, the present application provides a new method for charging a battery and a charge system.

Figure 1:
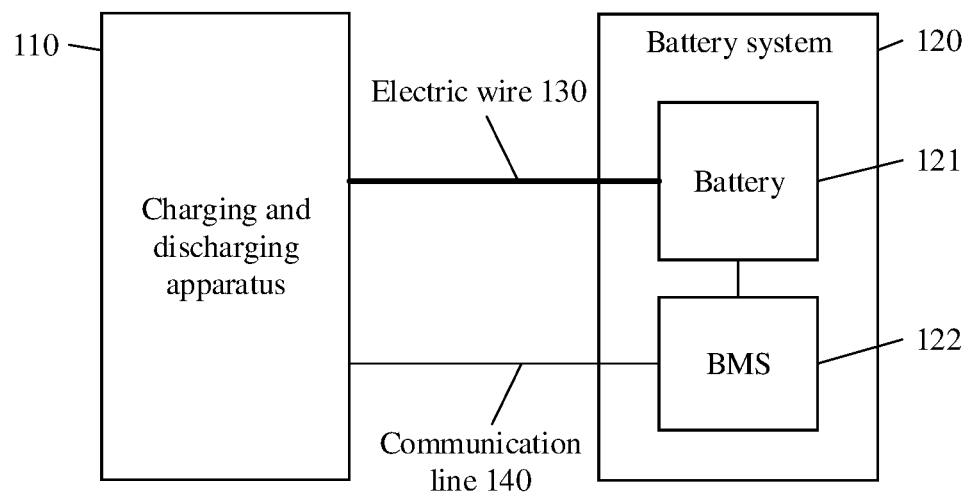
FIG. 1 is an architecture diagram of a charging system to which one embodiment of the present application is applicable.

FIG. 1 illustrates an architecture diagram of a charge system to which an embodiment of the present application is applicable.

As shown in FIG. 1, the charge system 100 may include: a charging and discharging device 110, and a battery system 120. Alternatively, the battery system 120 may be a battery system in an electric vehicle (including a battery electric vehicle or a plug-in hybrid electric vehicle) or a battery system in other application scene.

Alternatively, at least one battery pack (battery pack) may be arranged in the battery system 120, and the entirety of at least one battery pack may be collectively referred to as battery 121. From the type of the battery, the battery 121 may be any type of batteries, which includes but is not limited to: lithium-ion batteries, lithium metal batteries, lithium-sulfur batteries, lead-acid batteries, nickel-cadmium batteries, nickel-hydrogen batteries, or lithium air batteries. From the size of the battery, the battery 121 in the embodiments of the present application may be a cell/battery cell, or may also be a battery module or a battery pack; the battery module or the battery pack may be formed by connecting a plurality of batteries in parallel or in series. In the embodiments of the present application, the specific type and size of the battery 121 are not limited.

In addition, to intelligently manage and maintain the battery 121, prevent the battery from over charge and over discharge, and prolong the service life of the battery, a battery management system (BMS) 122 is also generally provided in the battery system 120 for monitoring a state of the battery 121. Alternatively, the BMS 122 and the battery 121 may be integrally arranged in the same apparatus/device, or, the BMS 122 may also be arranged outside the batter 121 as an independent apparatus/device.

Specifically, the charging-and-discharging apparatus 110 is a device for supplementing electric energy for the battery 121 in a battery system 120 and/or for controlling the battery 121 to discharge.

Alternatively, the charging-and-discharging apparatus 110 in the embodiments of the present application may be a normal charge pile, a super charge pipe, a charge pile supporting a vehicle to grid (V2G) mode, or a charging and discharging device/apparatus capable of charging and/or discharging the battery. The embodiments of the present application have no limitation on the specific type and specific application scene of the charging-and-discharging apparatus 110.

Alternatively, as shown in FIG. 1, the charging-and-discharging apparatus 110 may be connected to the battery 121 through an electric wire 130, and connected to the BMS 122 through a communication line 140, where the communication line 140 is used for achieving information interaction between the charging-and-discharging apparatus 110 and the BMS.

As an example, the communication line 140 includes but is not limited to a control area network (CAN) communication bus or a daisy chain communication bus.

Alternatively, the charging-and-discharging apparatus 110 may also communicate with the BMS 122 through a wireless network in addition to communicating with the BMS 122 through the communication line 140. The embodiments of the present application have not specific limitation on the type of wired communication or the type of wireless communication between the charging-and-discharging apparatus and the BMS 122.

Figure 2:
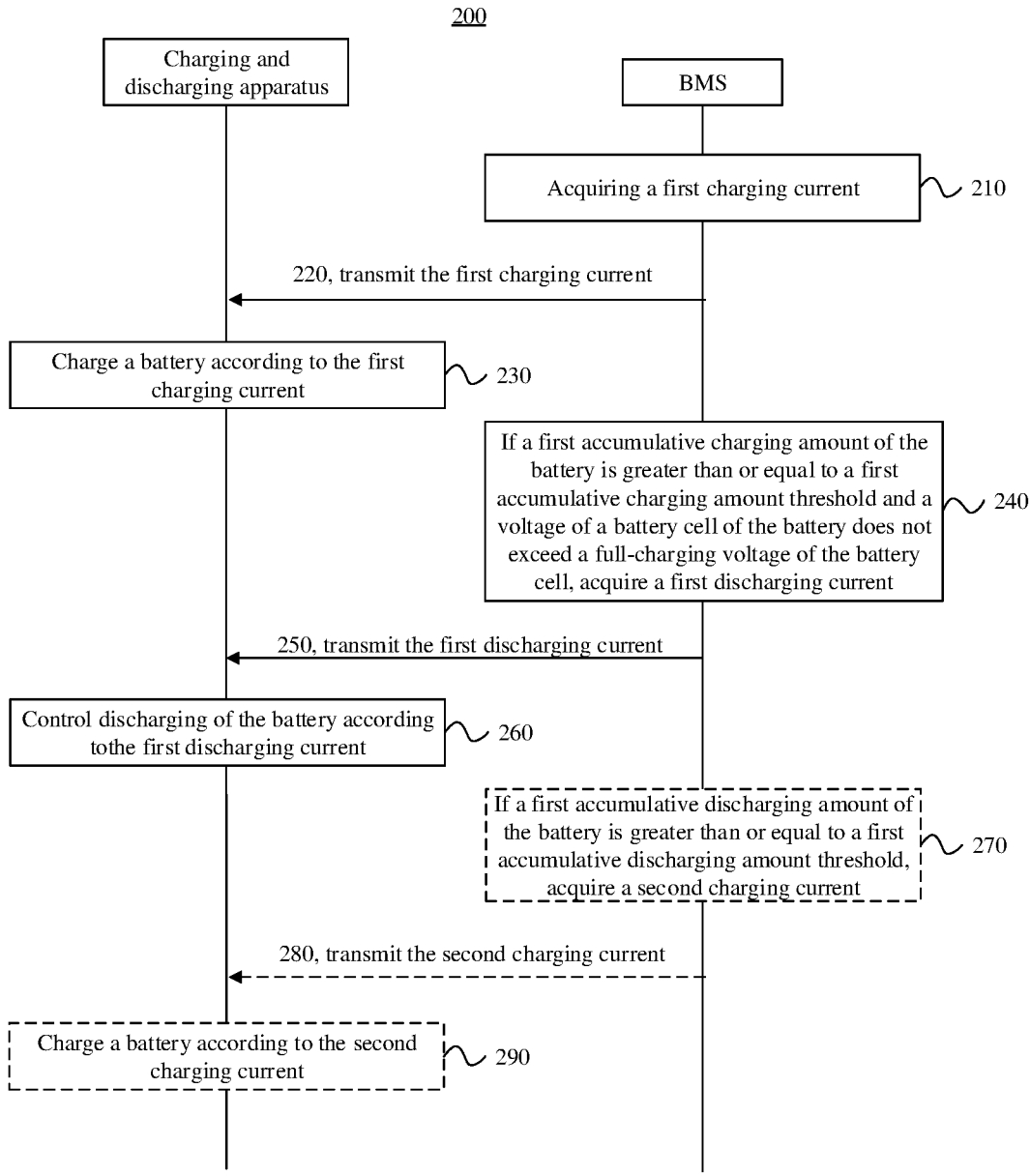
FIG. 2 is a flowchart interaction diagram of a method for charging a battery provided in an embodiment of the present application.

FIG. 2 illustrates a flowchart interaction diagram of a method 200 for charging a battery provided in an embodiment of the present application. Alternatively, the method 200 provided by the embodiments of the present application may be applicable to the charging-and-discharging apparatus 110 and the battery system 120 shown in FIG. 1.

As shown in FIG. 2, the method 200 for charging the battery may include the following steps.

Step 210: acquiring a first charging current by a BMS.

Step 220: sending the first charging current to the charging-and-discharging apparatus by the BMS.

Step 230: charging the battery according to the first charging current by the charging-and-discharging apparatus.

Step 240: acquiring a first discharging current by the BMS if a first accumulated charging amount of the battery is greater than or equal to a first accumulated charging amount threshold and a voltage of a battery cell of the battery does not exceed a full charge voltage of the battery cell.

Step 250: sending the first discharging current to the charging-and-discharging apparatus by the BMS.

Step 260: controlling the battery to discharge according to the first discharging current by the charging-and-discharging apparatus.

In the embodiments of the present application, a charging method capable of being achieved between the charging-and-discharging apparatus and the BMS is provided. In the process of charging the battery, the charging-and-discharging apparatus may achieve charging and discharging of the battery according to the first charging current and the first discharging current sent by the BMS, continuous charging of the battery is avoided, and therefore the problems of heating, lithium ion aggregation and the like caused by continuous charging of the battery are avoided. As the temperature of the battery rises due to heating, crystals generated by lithium ion aggregation may puncture the battery and cause electrolyte leakage to cause short circuit of the battery, and the temperature rise of the battery, the short circuit of the battery and the like may cause safety problems of the battery, such as battery combustion or explosion. Therefore, with the technical solutions of the embodiments of the present application, the charging-and-discharging apparatus achieves charging and discharging of the battery according to the first charging current and the first discharging current sent by the BMS, thus guaranteeing the safety performance of the battery. In addition, in the process of continuous charging, continuous aggregation of the lithium ions may cause the problem of lithium precipitation, which affects the service life and the charging capacity of the battery; therefore, with the technical solutions of the embodiments of the present application, the service life and the charging capacity of the battery may be guaranteed.

Specifically, in the step 210 to step 230, the BMS may firstly enter a charge mode to control the charging-and-discharging apparatus to charge the battery. At first, the BMS acquires a first charging current, and the charging-and-discharging apparatus charges the battery according to the received first charging current after the BMS sends the first charging current to the charging-and-discharging apparatus.

Alternatively, the BMS may acquire the first charging current from the own function unit, for example, from a storage unit or a processing unit; or, the BMS may acquire the first charging current from other devices. In some embodiments, the first charging current may be a preset current which may be a fixed value, or may be changed with time according to a preset way. Or, in some other embodiments, the first charging current may be a current determined according to a state parameter of the battery, the first charging current may be changed as the state parameter of the battery change.

Alternatively, the charging-and-discharging apparatus may be connected to a power source, the power source may be an alternating current (AC) power and/or a direct current (DC) power, the charging-and-discharging apparatus charges the battery through the AC power and/or the DC power according to the first charging current after receiving information of the first charging current.

Further, in the process that the charging-and-discharging apparatus charges the battery according to the first charging current, the BMS may acquire a first accumulated charging amount of the battery and judges whether the first accumulated charging amount is greater than or equal to a first accumulated charging amount threshold or not. If the first accumulated charging amount is greater than or equal to the first accumulated charging amount threshold and a voltage of a battery cell of the battery does not exceed a full charge voltage of the battery cell, the BMS acquires the first discharging current.

Specifically, knowing from the description about the battery in FIG. 1, the battery may include one or more battery cells, the BMS may monitor whether the battery has reached a fully charged state by monitoring a voltage of one or more battery cells in the battery. Alternatively, if the battery includes a plurality of battery cells, voltages of the plurality of battery cells may be different, under this circumstance, whether the battery has reached the fully charged state or not may be judged by judging whether the maximum voltage of the battery cell exceeds the full charge voltage of the battery cell. Or, in other modes, in addition to the maximum voltage of the battery cell, other voltages of the battery cell in the battery may be utilized to judge whether the battery has reached the fully charged state.

On the premise that the voltage of the battery cell of the battery does not exceed the full charge voltage of the battery cell, i.e., the battery does not reach the fully charged state, if the first accumulated charging amount of the battery is greater than or equal to a first accumulated charging amount threshold, the BMS acquires a first discharging current, i.e., the battery is switched to a discharge mode from a charge mode.

Alternatively, the above first accumulated charging amount may be a first accumulated charge capacity or may be a first accumulated charging amount. Correspondingly, if the first accumulated charging amount is the first accumulated charge capacity, the first accumulated charging amount threshold is a first accumulated charge capacity threshold value; if the first accumulated charging amount is the first accumulated charging amount, the first accumulated charging amount threshold is the first accumulated charging amount threshold.

In some embodiments, the first accumulated charging amount threshold may be a preset threshold value, the preset threshold value may be a fixed threshold value, or may be changed with time according to the preset way.

In some other embodiments, the first accumulated charging amount threshold may also be determined according to a state parameter of the battery, i.e., as the state parameter of the battery changes, the first accumulated charging amount threshold may also be changed accordingly. With the embodiment, the first accumulated charging amount threshold may be better adapted to the current state parameter of the battery, thus better controlling the current charging process, and improving the charging efficiency of the battery without damaging and effecting the battery.

Further, in the step 240 to step 260, the BMS acquires a first discharging current, and sends the first discharging current to the charging-and-discharging apparatus, and the charging-and-discharging apparatus controls the battery to discharge according to the received first discharging current.

Alternatively, the BMS may acquire the first discharging current from the own function unit (for example, a storage unit or a processing unit), or the BMS may acquire the first discharging current from other devices. In some embodiments, the first discharging current may be a preset current, the preset current may be a fixed value, or may be changed according to a preset way with the time. Or, in some other embodiments, the first discharging current may be a current determined according to the state parameter of the battery, and the first discharging current may be changed as the state parameter of the battery change. In some embodiments, in the discharge mode or discharge stage, the electricity of the battery may be sent to an energy storage device and/or a power grid, thus facilitating the cyclic utilization of the electric energy. The energy storage device may be arranged in the charging-and-discharging apparatus or may be arranged out of the charging-and-discharging apparatus, and is intended to make the energy storage device receive the discharging current of the battery. The embodiments of the present application have no limitation on the specific providing of the energy storage device. Alternatively, in the discharge mode, the power of the battery may be consumed in other ways. The embodiments of the present application have no limitation on the specific way of consuming the electric energy.

Further, in the process that the charging-and-discharging apparatus controls the discharge of the battery, the BMS may acquire a first accumulated discharging amount of the battery in the discharging process, and judge whether the first accumulated discharging amount is greater than or equal to a first accumulated discharging amount threshold.

Alternatively, the above first accumulated discharging amount may be a first accumulated discharge capacity or may be a first accumulated discharging amount. Correspondingly, if the first accumulated discharging amount is the first accumulated discharge capacity, the first accumulated discharging amount threshold is a first accumulated discharge capacity threshold value, and if the first accumulated discharging amount is the first accumulated discharging amount, the first accumulated discharging amount threshold is the first accumulated discharge electric amount threshold.

In some embodiments, the first accumulated discharging amount threshold may be a preset threshold value, the preset threshold value may be a fixed threshold value, or may be changed with time according to a preset way.

In some other embodiments, the first accumulated discharging amount threshold may be determined according to the state parameter of the battery, i.e., as the state parameter of the battery changes, the first accumulated discharging amount threshold is changed accordingly. Through the embodiments, the first accumulated discharging amount threshold may be better adapted to the current state parameter of the battery, thus better controlling the current discharging process and improving the discharging efficiency of the battery without damaging the battery.

When the first accumulated discharging amount is greater than or equal to the first accumulated discharging amount threshold, the charging-and-discharging apparatus controls the battery to stop discharging.

With above processes, the charge and the discharge of the battery are achieved by the charging-and-discharging apparatus according to the first charging current and the first discharging current sent by the BMS, thus avoiding the problems of heating, lithium ion aggregation, and the like of the battery caused by continuous charging, and then avoiding the safety problems, such as battery combustion or explosion, of the battery caused by the problems of heating, lithium ion aggregation and the like, and the safety performance of the battery is guaranteed. In addition, after the battery is charged to a first accumulated charging amount according to the first charging current and then the power of the battery is released to a first accumulated discharging amount according to the first discharging current, lithium ions gathered at a negative electrode of the battery in charging process may be released, and problem of lithium precipitation generated in continuous charging is prevented, thus prolonging the service life of the battery and improving the charge capacity of the battery.

For the charge of the battery, after one charge and one discharge, the battery may continue to be charged for a second time to continue to charge the battery.

Alternatively, as shown in FIG. 2, the method 200 for charging the battery in the embodiments of the present application further includes the following steps.

Step 270: acquiring a second charging current by the BMS if the first accumulated discharging amount of the battery is greater than or equal to the first accumulated discharging amount threshold.

Step 280: sending the second charging current to the charging-and-discharging apparatus by the BMS.

Step 290: charging the battery according to the second charging current by the charging-and-discharging apparatus.

Specifically, in the step 270 to step 290, when the BMS judges that the first accumulated discharging amount of the battery is greater than or equal to the first accumulated discharging amount threshold, the BMS acquires the second charging current, and sends the second charging current to the charging-and-discharging apparatus. The charging-and-discharging apparatus continues to charge the battery according to the received second charging current, i.e., for the battery, the battery reenters the charge mode from the discharge mode. Alternatively, other related technical solutions of the step 270 to step 290 may refer to above related description of the step 210 to step 230 and will not be described in detail here.

It may be understood that in the embodiments of the present application, the charge and the discharge of the battery require voltage information required by the charge and the discharge in addition to the current information required by the charge and the discharge. For example, in the step 210 to step 230: acquiring, by the BMS, the first charging current and a first charge voltage and sending the first charging current and the first discharging current to the charging-and-discharging apparatus, where the charging-and-discharging apparatus is configured to charge the battery according to the first charging current and the first charge voltage; in the step 240 to step 260, acquiring, by the BMS, the first discharging current and a first discharging voltage and sending the first discharging current and the first discharging voltage to the charging-and-discharging apparatus, where the charging-and-discharging apparatus is configured to discharge the battery according to the first discharging current and the first discharging voltage. The subsequent charging and discharging process may be similar to the above charging and discharging process and will not be described in detail.

Figure 3:
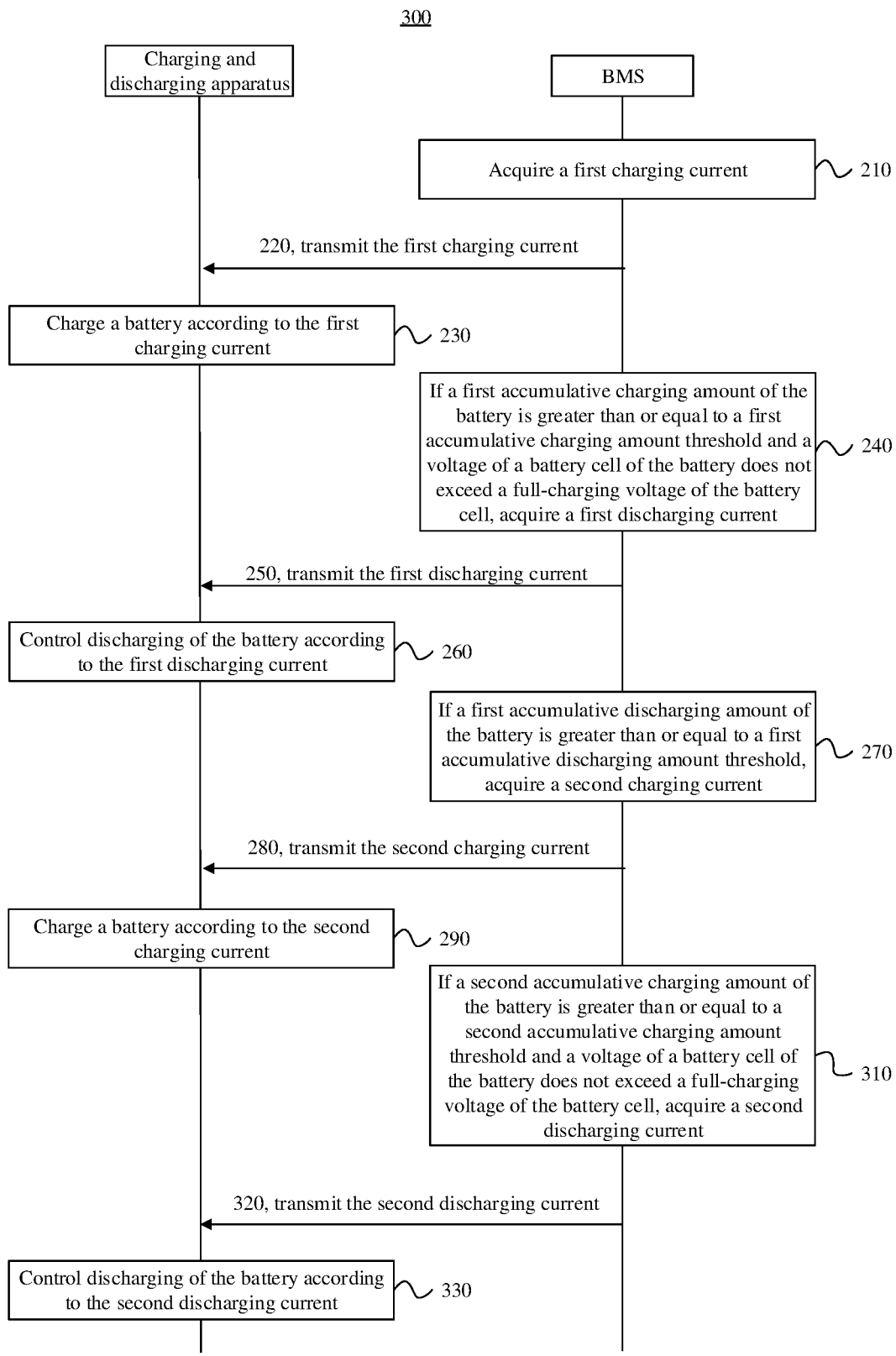
FIG. 3 is a flowchart interaction diagram of another method for charging a battery provided in an embodiment of the present application.

FIG. 3 illustrates a flowchart interaction diagram of another method 300 for charging a battery provided in an embodiment of the present application.

As shown in FIG. 3, except the above step 210 to step 290, the method 300 for charging the battery further includes the following steps.

Step 310: acquiring the second discharging current by the BMS if a second accumulated discharging amount of the battery is greater than or equal to a second accumulated charging amount threshold and a voltage of a battery cell of the battery does not exceed a full charge voltage of the battery cell.

Step 320: sending the second discharging current to the charging-and-discharging apparatus by the BMS.

Step 330: controlling the battery to discharge according to the second discharging current by the charging-and-discharging apparatus.

In the embodiments of the present application, the charge, discharge, recharge, and re-discharge of the battery are completed through information interaction between the BMS and the charging-and-discharging apparatus. According to this way, the embodiments of the present application may further provide a multi-cycle of charging-and-discharging method, the charging and discharging processes are sequentially and cyclically carried out to gradually charge the battery on the basis of ensuring the safety performance of the battery.

Specifically, in the step 310, when the charging-and-discharging apparatus is in the process of charging the battery according to the second charging current, the BMS may acquire a second accumulated charging amount of the battery, and may judge whether the second accumulated charging amount is greater than or equal to the second accumulated charging amount threshold.

Alternatively, the second accumulated charging amount may only be a charging amount to the battery by the charging-and-discharging apparatus according to the second charging current, or, the second accumulated charging amount may also be a current total charging amount of the battery. As an example, the current total charging amount of the battery=the charging amount according to the first charging current+the charging amount according to the second charging current−the discharging amount according to the first discharging current. Correspondingly, the second accumulated charging amount threshold may also be a charging amount threshold according to the single charging, or the second accumulated charging amount threshold may also be a charging amount threshold according to the total charging amount.

Similar to the first accumulated charging amount and the first accumulated charging amount threshold descried above, in the embodiments of the present application, the second accumulated charging amount may be a second accumulated charge capacity or may also be a second accumulated charging amount. Correspondingly, if the second accumulated charging amount is the second accumulated charge capacity, the first accumulated charging amount threshold is the second accumulated charge capacity threshold value; if the second accumulated charging amount is the second accumulated charging amount, the second accumulated charging amount threshold is the second accumulated charging amount threshold.

Alternatively, in some embodiments, the second accumulated charging amount threshold may be a preset threshold value. The preset threshold value may be a fixed threshold value, or may be changed with time according to the preset way.

In some other embodiments, the second accumulated charging amount threshold may also be determined according to a state parameter of the battery, i.e., when the state parameter of the battery changes, the second accumulated charging amount threshold is changed accordingly.

Further, in the step 310, when the second accumulated charging amount is greater than or equal to the second accumulated charging amount threshold, and the voltage of the battery cell of the battery does not exceed the full charge voltage of the battery cell, the BMS acquires the second discharging current. In the step 320 to step 330, the BMS sends the second discharging current to the charging-and-discharging apparatus, and the charging-and-discharging apparatus controls the battery to discharge according to the received second discharging current.

Specifically, other related technical solutions in the above steps may refer to the related description in the step 240 to step 260, and will not be described in detail here.

Figure 4:
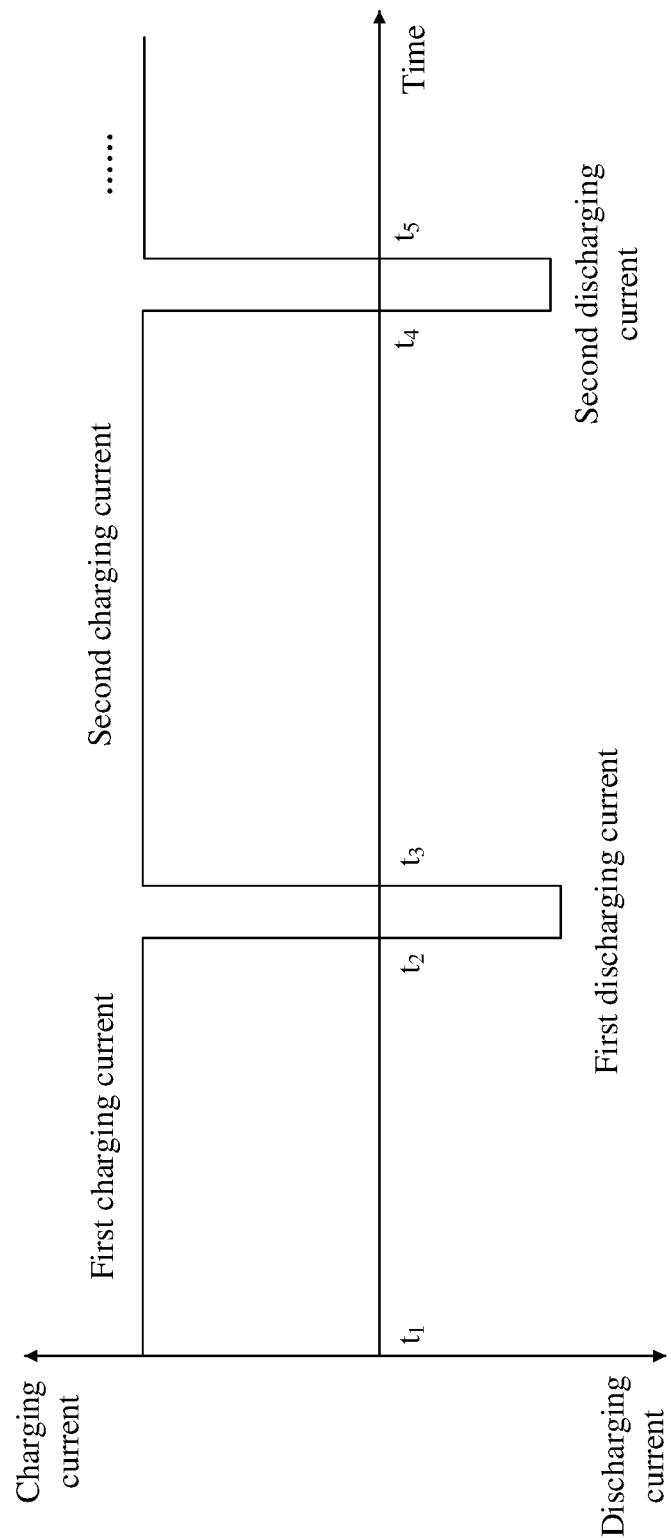
FIG. 4 is a schematic waveform diagram of a charging and a discharging current of a battery provided in an embodiment of the present application.

As an example, the FIG. 4 illustrates a schematic oscillogram of a charging current and a discharging current of a battery provided in an embodiment of the present application.

As shown in FIG. 4, from the time period t1 to t2, the charging-and-discharging apparatus charges the battery according to the first charging current until the first accumulated charging amount of the battery is greater than or equal to the first accumulated charging amount threshold and the voltage of the battery cell of the battery does not exceed the full charge voltage of the battery cell. From the time period t2 to t3, the charging-and-discharging apparatus controls the battery to discharge according to the first discharging current until the first accumulated discharging amount of the battery is greater than or equal to the first accumulated discharging amount threshold. Alternatively, the duration of the first discharging current may be less than the duration of the first charging current. From the time period t3 to t4, the charging-and-discharging apparatus continues to charge the battery according to the second charging current until the second accumulated charging amount of the battery is greater than or equal to the second accumulated charging amount threshold and the voltage of the battery cell of the battery does not exceed the full charge voltage of the battery cell. From the time period t4 to t5, the charging-and-discharging apparatus controls the battery to discharge according to the second discharging current until the second accumulated discharging amount of the battery is greater than or equal to the second accumulated discharging amount threshold. Alternatively, the duration of the second charging current may be less than the duration of the first charging current. It may be understood that the charging and discharging processes are continued until the battery is fully charged.

It should be noted that FIG. 4 only schematically illustrates oscillogram of a first charging current, a second charging current, a first discharging current, and a second discharging current. The first charging current may be a constant current shown in FIG. 4 from t1 to t2, or may also be a variable current changed with time. Similarly, the second charging current, the first discharging current and the second discharging current may be the constant current shown in FIG. 4, or may also be the variable current changed with time. Furthermore, the first charging current and the second charging current schematically shown in FIG. 4 are same in magnitude, and the first discharging current and the second discharging current are same in magnitude; in addition to this, the first charging current and the second charging current may also be different in magnitude, the first discharging current and the second discharging current may also be different in magnitude, and the embodiments of the present application have no specific limitation on this.

Figure 5:
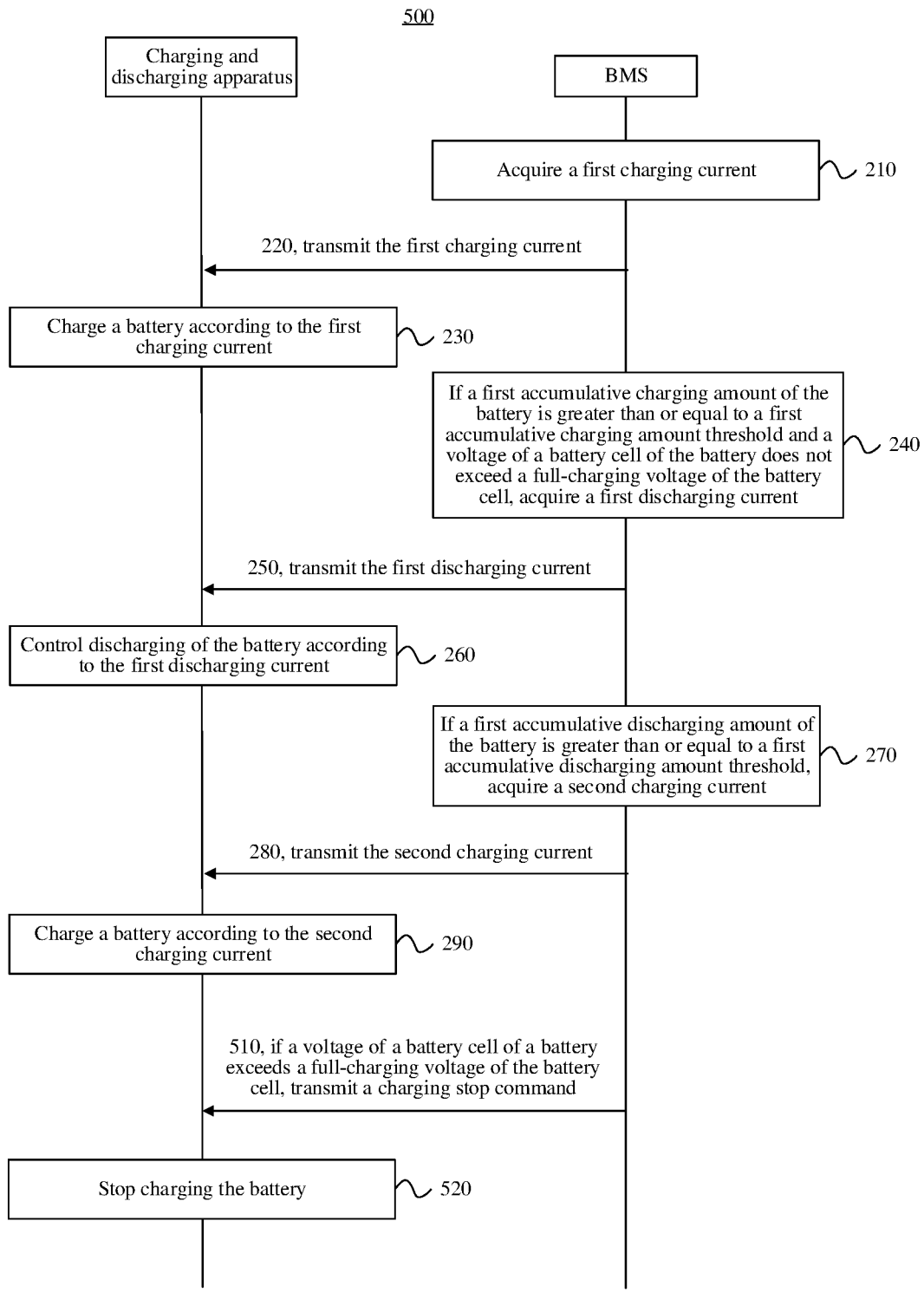
FIG. 5 is a flowchart interaction diagram of another method for charging a battery provided in an embodiment of the present application.

FIG. 5 illustrates a flowchart interaction diagram of another method 500 for charging a battery provided in an embodiment of the present application.

As shown in FIG. 5, except the above step 210 to step 290, the method 500 for charging the battery further includes the following steps.

Step 510: sending a charging stop command to the charging-and-discharging apparatus by the BMS if the voltage of the battery cell of the battery exceeds the full charge voltage of the battery cell.

Step 520, stopping charging the battery by the charging-and-discharging apparatus.

Specifically, as described above, the BMS may monitor whether a battery has reached a fully charged state by monitoring the voltage of one or more battery cells in the battery. Alternatively, in some embodiments, whether the battery has reached the fully charged state may be judged by judging whether the maximum voltage of the battery cell exceeds the full charge voltage of the battery cell. When the maximum voltage of the battery cell exceeds the full charge voltage of the battery cell, the battery has reached the fully charged state, and the BMS sends the charging stop command to the charging-and-discharging apparatus at the moment, where the charging stop command is used for instructing the charging-and-discharging apparatus to stop charging the battery, thus making the charging-and-discharging apparatus stop charging the battery.

Alternatively, the step 510 and the step 520 may be performed at the charge stage of the battery, in other words, after the BMS enters a charge mode and the charging and discharging receives the charging current sent by the BMS, in the process of charging the battery, the BMS may acquire the voltage of the battery cell of the battery to judge whether the battery has reached the fully charged state. Once the voltage of the battery cell of the battery exceeds the full charge voltage of the battery cell, the BMS sends the charging stop command to the charging-and-discharging apparatus to make the charging-and-discharging apparatus stop charging the battery.

Therefore, FIG. 5 only schematically illustrates that the step 510 and step 520 are performed after the step 290, i.e. performed in the process of the second charge. It may be understood that the step 510 and step 520 may also be performed during any one of the plurality of charging and discharging.

Alternatively, in the embodiments of above method, due to the fact that the charging-and-discharging apparatus is configured to charge, discharging and recharging the battery, the safety problem of the battery caused by continuous charging may be prevented. Further, the charging current in the method may be a high current to improve the charging amount of the battery in the single charging process, thus achieving the purpose of quick charge.

Moreover, due to limitation that lithium ions are gathered at a negative electrode in the continuous charging process, the charging current is also limited, and thus quick charge of the battery cannot be achieved by using continuous high current. However, provided in the technical solution of the embodiments of the present application, the battery is charged by using the high current, and the battery is discharged after one-time high-current charging to release the lithium ions gathered at the negative electrode of the battery in the charging process, and then the battery can be subsequently charged by utilizing the high current again, thus achieving quick charge of the battery.

Specifically, in the above method, the first charging current and/or the second charging current may be a high current; in addition, after the charging-and-discharging apparatus charges the battery according to the second charging current, the charging current in the subsequent charging process may also be the high current.

Alternatively, to achieve quick charge of the high current, a charging rate of the first charging current and/or the second charging current ranges from 2 C to 10 C.

Further, the discharging current in the embodiments of the present application may be low current, which aims at releasing lithium ions gathered at the negative electrode of the battery through low-current discharging of the battery without causing excessive loss of charging amount in the battery.

Specifically, the first discharging current and/or the second discharging current may be a low current; in addition, after the charging-and-discharging apparatus discharges the battery according to the second discharging current, the discharging current in the subsequent discharging process may also be the low current.

Alternatively, to achieve low-current discharging, a charging rate of the first discharging current and/or the second discharging current ranges from 0.1 C to 1 C.

Alternatively, in the above method, to control the charging amount of the battery in the charging process and the discharging amount of the battery in the discharging process battery, a ratio of an accumulated discharging amount threshold in the discharging process to an accumulated charge threshold value in the charging process may be provided to make the discharging amount be relatively small, without causing excessive loss of charging amount in the battery.

As an example, in the above method, a ratio of the first accumulated discharging amount threshold to the first accumulated charge threshold value is less than or equal to 10%, and/or, a ratio of the second accumulated discharging amount threshold to the second accumulated charge threshold value is less than or equal to 10%, In addition to this, after the charging-and-discharging apparatus charges the battery and controls the battery to discharge respectively according to the second charging current and the second discharging current, a ratio of an accumulated discharging amount threshold to an accumulated charging amount threshold in the subsequent charging and discharging process may also be less than or equal to 10%.

It should be noted that, the ratio of 10% may also be adjusted with the change of the application scene and the application demand, and the present application has no limitation on the specific value of the ratio.

Alternatively, in the embodiments of the above method, the first charging current and the second charging current acquired by the BMS may be same or different. The first charging current and/or the second charging current may be a preset current, or, the first charging current and/or the second charging current may also be a current determined according to a state parameter of the battery; when the state parameter of the battery changes, the first charging current and/or the second charging current may be different currents corresponding to different state parameters. The state parameter of the battery includes at least one of the following parameters: a battery temperature, a battery voltage, a battery current, a state of charge (SOC) of the battery, a state of health (SOH) of the battery and the like.

Similar, the first discharging current and the second discharging current acquired by the BMS may be same or different. The first discharging current and/or the second discharging current may be a preset current, or, the first discharging current and/or the second discharging current may also be a current determined according to the state parameter of the battery;

If at least one of the first charging current, the second charging current, the first discharging current and the second discharging current is the current determined according to the state parameter of the battery, the current may be better adapted to the current state parameter of the battery to improve the charging efficiency and/or discharging efficiency of the battery without damaging the battery.

In addition to this, after the charging-and-discharging apparatus charges the battery and controls the battery to discharge according to the second charging current and the second discharging current, the charging current and/or the discharging current in the subsequent charging and discharging process may also be the preset current, or may also be the current determined according to the state parameter of the battery.

Figure 6:
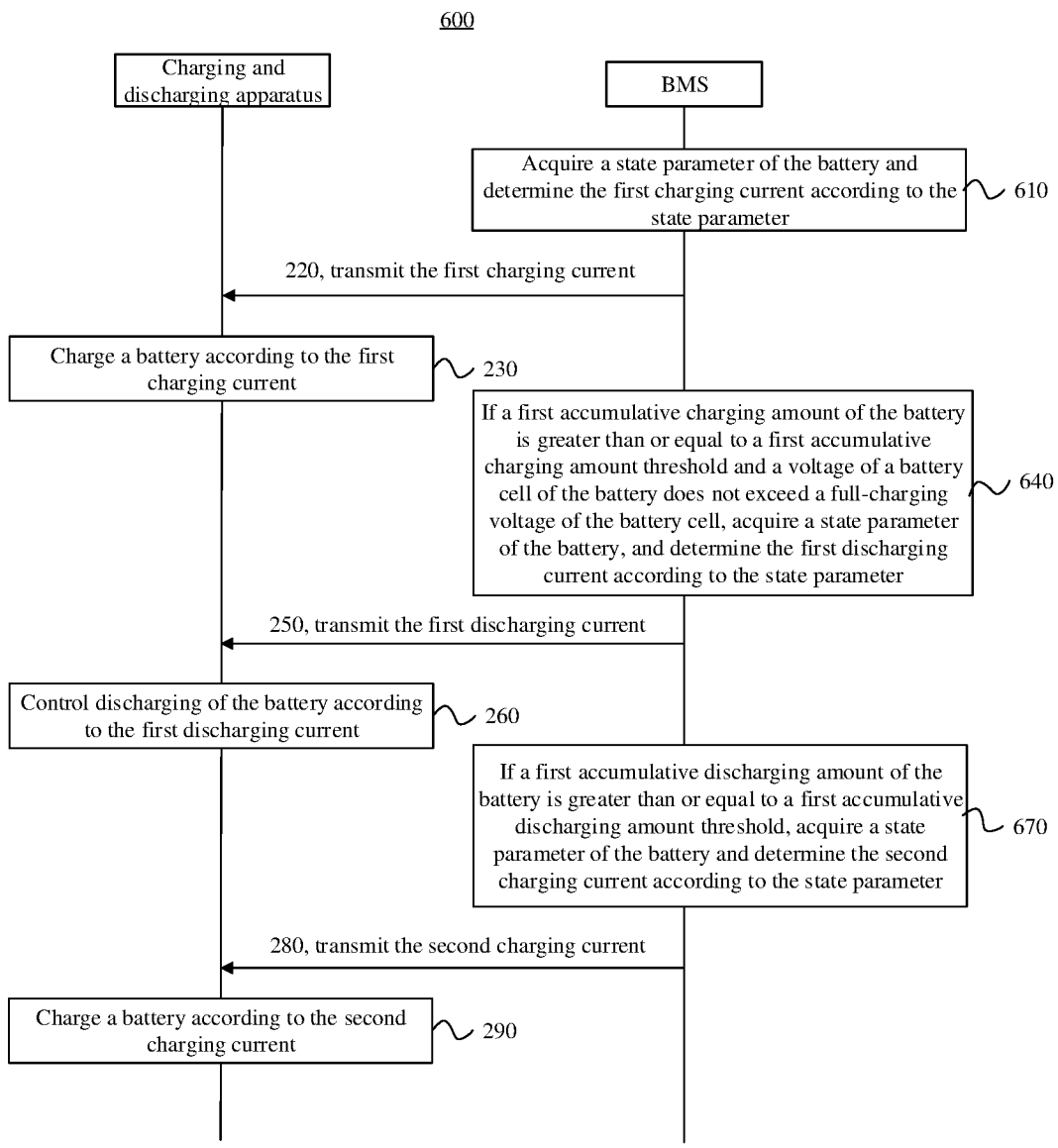
FIG. 6 is a flowchart interaction diagram of another method for charging a battery provided in an embodiment of the present application.

FIG. 6 illustrates a flowchart interaction diagram of another method 600 for charging a battery provided in an embodiment of the present application.

According to the method 200 shown in FIG. 2, as shown in FIG. 6, the above step 210 may include:

step 610: acquiring the state parameter of the battery by the BMS, and determining the first charging current according to the state parameter.

The above step 240 may include:

step 640: acquiring the state parameter of the battery by the BMS, and determining the first discharging current according to the state parameter if the first accumulated charging amount of the battery is greater than or equal to the first accumulated charging amount threshold and the voltage of the battery cell of the battery does not exceed the full charge voltage of the battery cell.

The above step 270 may include:

step 670: acquiring the state parameter of the battery by the BMS, and determining the second charging current according to the state parameter if the first accumulated discharging amount of the battery is greater than or equal to the first accumulated discharging amount threshold.

In addition to this, other steps of the method 600 in the embodiments of the present application may refer to the related description of the embodiments shown in FIG. 2, and will not be described in detail here.

Specifically, in the embodiments of the present application, the first charging current, the first discharging current and the second charging current are all current determined according to the state parameter of the battery. In different time periods, the BMS may acquire different state parameters of the battery, and may determine the current charging current and discharging current according to the state parameters.

Alternatively, the determination of the charging current and the discharging current according to the state parameter of the battery may be achieved in various ways. As one example, a mapping relation between the state parameter of the battery and the charging current and the discharging current may be acquired, and the specific charging current and the specific discharging current are determined through the state parameter of the battery according to the mapping relation. The mapping relation may be a mapping relation acquired through fitting of a large amount of experimental data, with high credibility and accuracy; and specifically, the mapping relation may be a mapping table, a mapping graph or a mapping formula and the like. In addition, in other examples, a dedicated neural network model may be trained according to a large amount of experimental data, and the neural network model may output the charging current and the discharging current according to input state parameter of the battery.

Alternatively, in addition to the charging current and the discharging current, in the embodiments of the above method, the first accumulated charging amount threshold and the second accumulated charging amount threshold may be same or different. The first accumulated discharging amount threshold and the second accumulated discharging amount threshold may be same or different. At least one of the first accumulated charging amount threshold, the second accumulated charging amount threshold, the first accumulated discharging amount threshold and the second accumulated discharging amount threshold may be a preset threshold value. Or, at least one of the first accumulated charging amount threshold, the second accumulated charging amount threshold, the first accumulated discharging amount threshold and the second accumulated discharging amount threshold may also be a threshold value determined according to the state parameter of the battery.

In addition to this, after the charging-and-discharging apparatus charges the battery and controls the battery to discharge according to the second charging current and the second discharging current, the accumulated discharging amount threshold and the accumulated charging amount threshold in the subsequent charging and discharging process may be a preset threshold value, or may also be the threshold value based on the state parameter of the battery.

Through the embodiments of the present application, if at least one of the first accumulated charging amount threshold, the second accumulated charging amount threshold, the first accumulated discharging amount threshold and the second accumulated discharging amount threshold is a threshold value determined according to the state parameter of the battery, the threshold value may be adapted to the current state parameters of the battery better to control the current charging process and/or discharging process, the charging amount and the discharging amount are guaranteed, and the efficient charge of the battery is achieved.

Alternatively, in the embodiments of the above method, at least one of the first charging current, the second charging current, the first discharging current and the second discharging current may be a current acquired by the BMS regularly or irregularly. As an example, at least one of the first charging current, the second charging current, the first discharging current and the second discharging current may be the current determined by the BMS regularly or irregularly according to the state parameters of the battery, and the current is changed with the change of the state parameter of the battery. Specifically, the BMS may acquire the state parameters of the battery regularly to determine at least one of the first charging current, the second charging current, the first discharging current and the second discharging current. Or the BMS acquires the state parameters of the battery in real time; when the state parameter changes irregularly, the BMS determines at least one of the first charging current, the second charging current, the first discharging current and the second discharging current according to the irregularly changed state parameters.

Further, on this basis, the BMS sends at least one of the first charging current, the second charging current, the first discharging current and the second discharging current to the charging-and-discharging apparatus regularly or irregularly, thus making the charging-and-discharging apparatus charge the battery or control the battery to discharge according to the regularly or irregularly sent current.

In the implementation mode, in the process that the charging-and-discharging apparatus performs a single charging and/or single discharging on the battery, the charging current and/or the discharging current are sent by the BMS regularly or irregularly. On the one hand, the charging current and/or discharging current may be adjusted regularly or irregularly through the implementation mode to improve the charging and discharging efficiency, and on the other hand, the charging current and/or the discharging current sent regularly or irregularly indicate that the states of the BMS and the battery are normal, and the charging-and-discharging apparatus may continue to charge the battery or control the battery to discharge. Therefore, in the implementation mode, if the charging-and-discharging apparatus does not receive the charging current and/or the discharging current sent by the BMS regularly or irregularly, the charging-and-discharging apparatus may stop charging the battery and/or stop controlling the battery to discharge, thus guaranteeing the safety performance of the battery.

Figure 7:
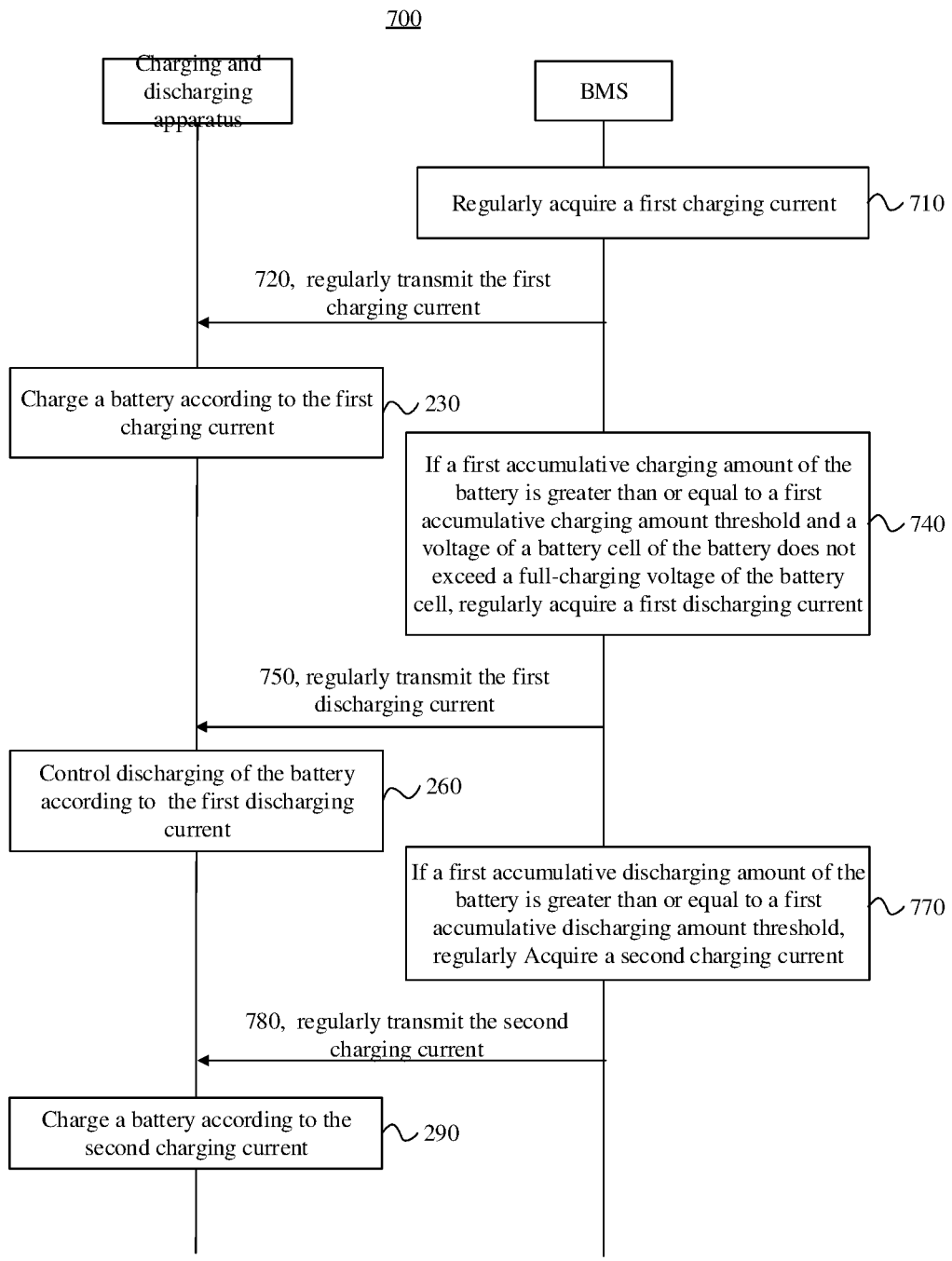
FIG. 7 is a flowchart interaction diagram of another method for charging a battery provided in an embodiment of the present application.

FIG. 7 illustrates a flowchart interaction diagram of another method 700 for charging a battery provided in an embodiment of the present application.

According to the method 200 show in FIG. 2, as shown in FIG. 7, the step 210 may include:

step 710: regularly acquiring the first charging current by the BMS.

The step 220 may include:

step 720: regularly sending the first charging current to the charging-and-discharging apparatus by the BMS.

The step 240 may include:

step 740: regularly acquiring the first discharging current if a first accumulated charging amount of the battery is greater than or equal to a first accumulated charging amount threshold and a voltage of a battery cell of the battery does not exceed a full charge voltage of the battery cell.

The step 250 may include:

step 750: regularly sending the first discharging current to the charging-and-discharging apparatus by the BMS.

The step 270 may include:

Step 770: regularly acquiring the second charging current if a first accumulated discharging amount of the battery is greater than or equal to a first accumulated discharging amount threshold.

The step 280 may include:

step 780: regularly sending the second charging current to the charging-and-discharging apparatus by the BMS.

In addition to this, other steps of the method 700 in the embodiments of the present application may refer to the related description of the embodiments shown in FIG. 2, and will not be described in detail here.

In the embodiments of the present application, the BMS may regularly acquire the first charging current, the first discharging current, and the second charging current. Correspondingly, the BMS may regularly send the first charging current, the first discharging current and the second charging current to the charging-and-discharging apparatus.

It should be understood that in the embodiments, the charging and discharging of the battery require voltage information required by charging and discharging in addition to the current information required by charging and discharging, and the acquisition way of the voltage required by charging and discharging has no any limitation on the embodiments of the present application.

Alternatively, in the above embodiments of the method, the communication between the BMS and the charging-and-discharging apparatus may be compatible with a communication protocol between an existing charger and the BMS, and thus the communication between the BMS and the charging-and-discharging apparatus is convenient to achieve, and the good application prospect is provided.

Specifically, on the basis of the above embodiments of the method, the BMS may also acquire at least one of a first charge voltage, a second charge voltage, a first discharging voltage, and a second discharging voltage, and sends at least one of the first charge voltage, the second charge voltage, the first discharging voltage and the second discharging voltage to the charging-and-discharging apparatus, where the first charging current and the first charge voltage are carried in a first battery charge demand message (BCL message), and/or, the first discharging current and the first discharging voltage are carried in a second BCL message, and/or, the second charging current and the second charge voltage are carried in a third BCL message, and/or, the second discharging current and the second discharging voltage are carried in a fourth BCL message.

In addition to this, after the charging-and-discharging apparatus charges the battery and controls the battery to discharge according to the second charging current and the second discharging current, the charging current, the charge voltage, the discharging current and the discharging voltage in the subsequent charging and discharging process may also be carried in the BCL message and sent to the charging-and-discharging apparatus by the BMS.

Figure 8:
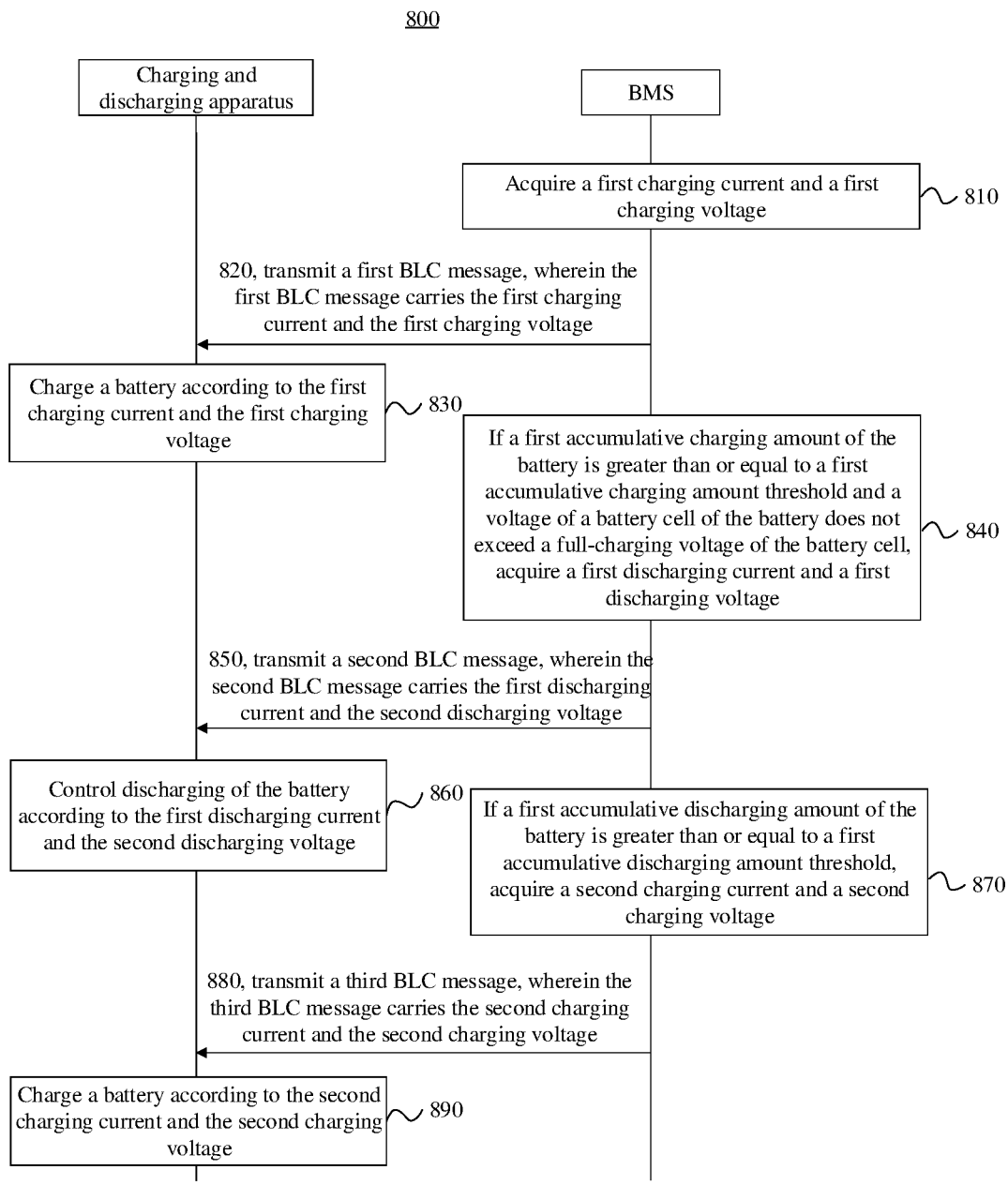
FIG. 8 is a flowchart interaction diagram of another method for charging a battery provided in an embodiment of the present application.

FIG. 8 illustrates a s flowchart interaction diagram of another method 800 for charging a battery provided in an embodiment of the present application.

As shown in FIG. 8, the method 800 for charging the battery may include the following steps.

Step 810: acquiring the first charging current and the first charge voltage by the BMS.

Step 820: sending the first BCL message to the charging-and-discharging apparatus by the BMS, the first BCL message carrying the first charging current and the first charge voltage.

Step 830: charging the battery by the charging-and-discharging apparatus according to the first charging current and the first charge voltage.

Step 840: acquiring the first discharging current and the first discharging voltage by the BMS if a first accumulated charging amount of the battery is greater than or equal to a first accumulated charging amount threshold and a voltage of a battery cell of the battery does not exceed a full charge voltage of the battery cell.

Step 850: sending the second BCL message to the charging-and-discharging apparatus by the BMS, the second BCL message carrying the first discharging current and the first discharging voltage.

Step 860: controlling the battery to discharge by the charging-and-discharging apparatus according to the first discharging current and the first discharging voltage.

Step 870: acquiring the second charging current and the second charge voltage by the BMS if a first accumulated discharging amount of the battery is greater than or equal to a first accumulated discharging amount threshold.

Step 880: sending the third BCL message to the charging-and-discharging apparatus by the BMS, the third BCL message carrying the second charging current and the second charge voltage.

Step 890: charging the battery by the charging-and-discharging apparatus according to the second charging current and the second charge voltage.

In the embodiments of the present application, by utilizing the battery charge demand BCL message in a communication protocol between an existing charger and the BMS, the BMS sends the charging current and the discharging current to the charging-and-discharging apparatus, and the charging-and-discharging apparatus charges the battery or controls the battery to discharge according to the received charging current and the discharging current.

Alternatively, in the BCL message, the charge voltage (including the first charge voltage and the second charge voltage) and the discharging voltage (including the first discharging voltage and the second discharging voltage) are different in range, and the charging current (including the first charging current and the second charging current) and the discharging current (including the first discharging current and the second discharging current) are different in range. In the BCL message received by the charging-and-discharging apparatus, whether the voltage and current belong to the charge voltage and charging current or the discharging voltage and the discharging current may be judged through the magnitude of the voltage and the current carried in the BCL message.

Alternatively, the BMS may determine the charge voltage and the discharging voltage according to the state parameter of the battery, or the charge voltage and the discharging voltage may also be a preset value.

Alternatively, in some embodiments, the BMS may regularly acquire the charging current and the discharging current and regularly send a BCL message carrying the charging current and the charge voltage to the charging-and-discharging apparatus. Similarly, the BMS may also regularly acquire the discharging current and the discharging voltage, and regularly send the BCL message carrying the discharging current and the discharging voltage to the charging-and-discharging apparatus. In the embodiment, the regular sending way of the BCL message may be same as that of the BCL message in an existing standard.

In the above embodiment, an information interaction message of charge and discharging current and/or voltage is used as an example for explanation, and it may be understood that in order to achieve charging and discharging of the battery, in addition to processing at the charging and discharging stage, handshake interaction between a vehicle and a charger before charging and discharging, parameter configuration interaction of charging and discharging and the like may be included; the embodiments of the present application have no specific limitation on this.

Alternatively, the communication protocol between the charger and the BMS includes a communication protocol under a vehicle to grid (V2G) mode and a grid to vehicle (G2V) mode.

Specific embodiments of the method for charging the battery provided herein are described above in conjunction with FIG. 2 to FIG. 8, and specific embodiments of related devices provided herein are described below in conjunction with FIG. 9 to FIG. 12, it may be understood that the related descriptions in the following device embodiments may refer to the aforementioned method embodiments and are not described in detail for brevity.

Figure 9:
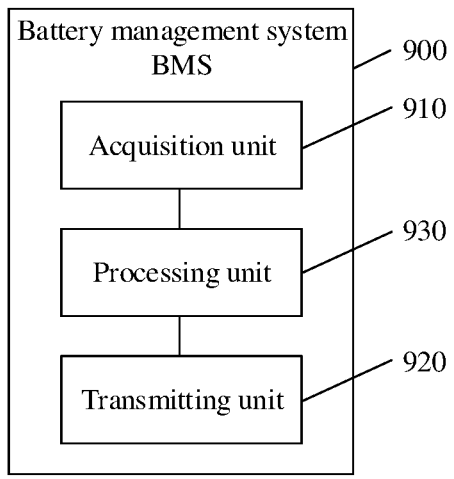
FIG. 9 is a schematic structural block diagram of a battery management system (BMS) provided in an embodiment of the present application.

FIG. 9 illustrates a schematic structure block diagram of a battery management system BMS 900 provided in one embodiment of the present application. As shown in FIG. 9, the BMS 900 includes an acquisition unit 910, a sending unit 920, and a processing unit 930.

In one embodiment of the present application, the acquisition unit 910 is configured to acquire a first charging current; a sending unit 920 is configured to send the first charging current to a charging and discharging device, thus making the charging-and-discharging apparatus charge the battery according to the first charging current; the processing unit 930 is configured to determine that the acquisition unit 910 is further configured to acquire a first discharging current when a first accumulated charging amount of the battery is greater than or equal to a first accumulated charging amount threshold and a voltage of a battery cell of the battery does not exceed a full charge voltage of the battery cell; the sending unit 920 is further configured to send the first discharging current to the charging-and-discharging apparatus, thus making the charging-and-discharging apparatus control the battery to discharge according to the first discharging current; alternatively, the processing unit 930 is further configured to determine that the acquisition unit 910 is further configured to acquire a second charging current when a first accumulated discharging amount of the battery is greater than or equal to a first accumulated discharging amount threshold; and the sending unit 920 is further configured to send the second charging current to the charging-and-discharging apparatus, thus making the charging-and-discharging apparatus charge the battery according to the second charging current.

Alternatively, the processing unit 930 is further configured to determine that the acquisition unit 910 is further configured to acquire a second discharging current when a second accumulated charging amount of the battery is greater than or equal to the second accumulated charging amount threshold and the voltage of the battery cell of the battery does not exceed the full charge voltage of the battery cell; the sending unit 920 is further configured to send the second discharging current to the charging-and-discharging apparatus, thus making the charging-and-discharging apparatus control the battery to discharge according to the second discharging current.

Alternatively, the processing unit 930 is further configured to determine that the voltage of the battery cell of the battery exceeds the full charge voltage of the battery cell, and the sending unit 920 is further configured to send a charging stop command to the charging-and-discharging apparatus, the charging stop command being used for instructing the charging-and-discharging apparatus to stop charging the battery.

Alternatively, a charging rate of the first charging current and/or the second charging current ranges from 2 C to 10 C.

Alternatively, a discharging rate of the first discharging current and/or the second discharging current ranges from 0.1 C to 1 C.

Alternatively, a ratio of the first accumulated discharging amount threshold to the first accumulated charging amount threshold is less than or equal to 10%, and/or, a ratio of the second accumulated discharging amount threshold to the second accumulated charging amount threshold is less than or equal to 10%.

Alternatively, the acquisition unit 910 is configured to acquire state parameters of the battery and determining the first charging current according to the state parameters; and/or, the acquisition unit 910 is configured to acquire the state parameters of the battery and determining the first discharging current according to the state parameters; and/or, the acquisition unit 910 is configured to acquire the state parameters of the battery and determining the first discharging current according to the state parameters; where the state parameters of the battery include at least one of the following parameters: a battery temperature, a battery voltage, a battery current, a state of charge of the battery, and a state of health of the battery.

Alternatively, the acquisition unit 910 is configured to acquire the first discharging current, the sending unit 920 is configured to regularly send the first discharging current to the charging-and-discharging apparatus; and/or, the acquisition unit 910 is configured to regularly acquire the first discharging current, and the sending unit 920 is configured to regularly send the first discharging current to the charging-and-discharging apparatus; and/or, the acquisition unit 910 is configured to regularly acquire the second charging current, and the sending unit 920 is configured to send the second charging current to the charging-and-discharging apparatus.

Alternatively, the acquisition unit 910 is further configured to acquire the first charge voltage, the sending unit 920 is configured to send the first charge voltage to the charging-and-discharging apparatus, where the first charging current and the first charge voltage are carried in a first battery charge demand BCL message; and/or, the acquisition unit 910 is further configured to acquire the first discharging voltage, the sending unit 920 is further configured to send the first discharging voltage to the charging-and-discharging apparatus, where the first discharging current and the first discharging voltage are carried in a second BCL message; and/or, the acquisition unit 910 is further configured to acquire the second charge voltage, and the sending unit 920 is further configured to send the second charge voltage to the charging-and-discharging apparatus, where the second charging current and the second charge voltage are carried in a third BCL message; and/or, the acquisition unit 910 is further configured to acquire the second discharging voltage, and the sending unit 920 is further configured to send the second discharging voltage to the charging-and-discharging apparatus, where the second discharging current and the second discharging voltage are carried in a fourth BCL message.

Figure 10:
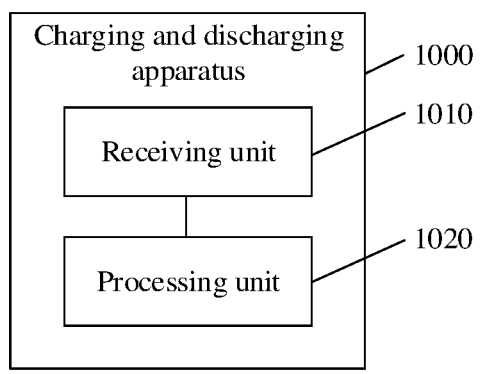
FIG. 10 is a schematic structural block diagram of a charging-and-discharging apparatus provided in an embodiment of the present application.

FIG. 10 illustrates a schematic structure block diagram of a charging and discharging device 1000 of one embodiment of the present application. As shown in FIG. 10, the charging-and-discharging apparatus 1000 includes a receiving unit 1010 and a processing unit 1020.

In one embodiment of the present application, the receiving unit 1010 is configured to receive a first charging current sent by a battery management system (BMS); a processing unit 1020 is configured to charge a battery according to the first charging current; the receiving unit 1010 is further configured to receive a first discharging current sent by the BMS, the processing unit 1020 is further configured to control the battery to discharge according to the first discharging current, where the first discharging current is a discharging current sent by the BMS when a first accumulated charging amount of the battery is greater than or equal to a first accumulated charging amount threshold and a voltage of a battery cell of the battery does not exceed a full charge voltage of the battery cell; and the receiving unit 1010 is further configured to receive a second charging current sent by the BMS, and the processing unit 1020 is further configured to charge the battery according to the second charging current, where the second charging current is a charging current sent by the BMS when a first accumulated discharging amount of the battery is greater than or equal to a first accumulated discharging amount threshold.

Alternatively, the receiving unit 1010 is further configured to receive a second discharging current sent by the BMS, the processing unit 1020 is further configured to control the battery to discharge according to the second discharging current, where the second discharging current is a discharging current sent by the BMS when a second accumulated discharging amount of the battery is greater than or equal to a second accumulated discharging amount threshold and the voltage of the battery cell of the battery does not exceed the full charge voltage of the battery cell.

Alternatively, the receiving unit 1010 is further configured to receive a charging stop command sent by the BMS, the processing unit 1020 is configured to stop charging the battery, where the charging stop command is a command sent by the BMS when the voltage of the battery cell of the battery exceeds the full charge voltage of the battery cell.

Alternatively, a charging rate of the first charging current and/or the second charging current ranges from 2 C to 10 C.

Alternatively, a discharging rate of the first discharging current and/or the second discharging current ranges from 0.1 C to 1 C.

Alternatively, a ratio of the first accumulated discharging amount threshold to the first accumulated charging amount threshold is less than or equal to 10%, and/or, a ratio of the second accumulated discharging amount threshold to the second accumulated charging amount threshold is less than or equal to 10%.

Alternatively, at least one of the first charging current, the first discharging current and the second charging current is determined according to state parameters of the battery, where the state parameters of the battery include at least one of the following parameters: a battery temperature, a battery voltage, a battery current, a state of charge of the battery, and a state of health of the battery.

Alternatively, the receiving unit 1010 is further configured to regularly receive a first charging current sent by the BMS; and/or, the receiving unit 1010 is configured to regularly receive a first discharging current sent by the BMS; and/or, the receiving unit 1010 is configured to regularly receive a second charging current sent by the BMS.

Alternatively, the receiving unit 1010 is further configured to receive the first charge voltage sent by the BMS, where the first charge voltage and the first charging current are carried in a first battery charging demand BCL message; and/or, the receiving unit 1010 is further configured to receive the first discharging voltage sent by the BMS, where the first discharging voltage and the first discharging current are carried in a second BCL message; and/or, the receiving unit 1010 is further configured to receive the second charge voltage sent by the BMS, where the second charge voltage and the second charging current are carried in a third BCL message; and/or, the receiving unit 1010 is further configured to receive the second discharging voltage sent by the BMS, where the second discharging voltage and the second discharging current are carried in a fourth BCL message.

Embodiments of the method and the device for charging the battery based on information interaction between a charging and discharging device and a BMS are described above in connection with FIG. 2 to FIG. 10, and for the charging-and-discharging apparatus, the battery may be charged and controlled to discharge through different hardware architecture.

Figure 11:
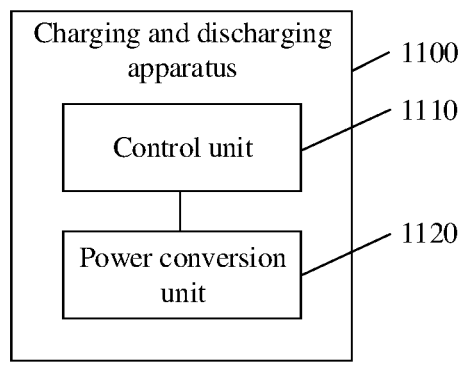
FIG. 11 is a schematic structural block diagram of another charging-and-discharging apparatus provided in an embodiment of the present application.

FIG. 11 illustrates a schematic structure block diagram of another charging and discharging device provided in an embodiment of the present application.

As shown in FIG. 11, the charging-and-discharging apparatus 1100 may include a control unit 1110 and a power conversion unit 1120.

In one embodiment, the control unit 1110 is configured to receive a first charging current sent by a BMS and controlling the power conversion unit 1120 to charge the battery according to the first charging current; the control unit 1110 is further configured to receive a first discharging current sent by the BMS and controlling the power conversion unit 1120 according to the first discharging current, thus making the battery discharge, where the first discharging current is a discharging current sent by the BMS when a first accumulated charging amount of the battery is greater than or equal to a first accumulated charging amount threshold and a voltage of a battery cell of the battery does not exceed a full charge voltage of the battery cell; the control unit 1110 is further configured to receive a second charging current sent by the BMS, and controlling the power conversion unit 1120 to charge the battery according to the second charging current, where the second charging current is a charging current sent by the BMS when a first accumulated discharging amount of the battery is greater than or equal to a first accumulated discharging amount threshold.

Specifically, the power conversion unit 1120 may include a high-voltage component for achieving high-power electric energy conversion, and the control unit 1110 may include a low-voltage circuit for achieving a control function of the high-voltage component in the power conversion unit 1120. In addition to this, the control unit 1110 may also establish a communication connection with the BMS, for example, by way of example but not limitation, the control unit 1110 may establish a communication connection with the BMS via a communication bus, or the control unit 1110 may also establish a communication connection with the BMS via a wireless network.

Figure 12:
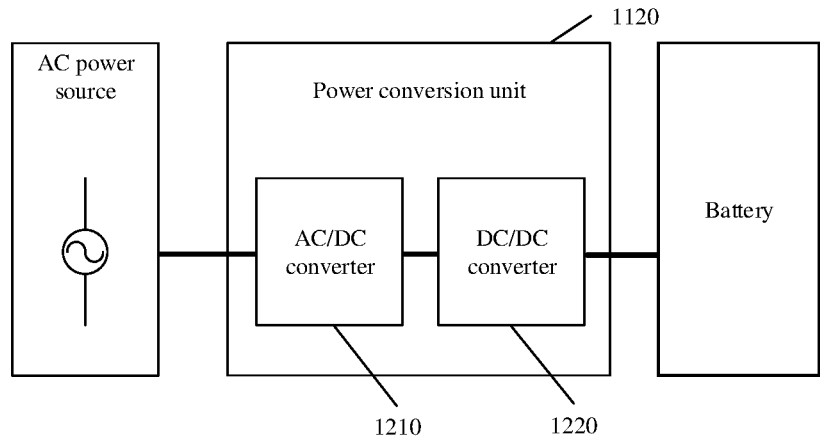
FIG. 12 is a schematic structural block diagram of a power conversion unit in a charging-and-discharging apparatus provided in an embodiment of the present application.

Alternatively, as an example, FIG. 12 illustrates a schematic structure block diagram of a power conversion unit 1120 provided in an embodiment of the present application. The power conversion unit 1120 shown in FIG. 12 can be applied to the charging-and-discharging apparatus in any one of the above embodiments.

As shown in FIG. 12, the power conversion unit 1120 can be connected to an (alternating current, AC) power source and a battery. The power conversion unit 1120 includes an (alternating current/direct current, AC/DC) converter 1210 and a first (direct current/direct current, DC/DC) converter 1220, where a first end of the AC/DC converter 1210 is connected to an AC power, a second end of the AC/DC converter 1210 is connected to a first end of the first DC/DC converter 1220, and a second end of the first DC/DC converter 1220 is connected to a battery, to realize transmission of a current between the battery and the AC power.

In this case, the control unit 1110 can control the AC/DC converter 1210 and the first DC/DC converter 1220 based on the first charging current to charge the battery through the AC power; and/or the control unit 1110 can control the AC/DC converter 1210 and the first DC/DC converter 1220 based on the second charging current to charge the battery through the AC power.

The AC/DC converter 1210 can be a bidirectional AC/DC converter and the first DC/DC converter 1220 can be a bidirectional DC/DC converter. In this case, the control unit 1110 can control the AC/DC converter 1210 and the first DC/C converter 1220 based on the first discharging current to enable discharging of the battery to the AC power.

Figure 13:
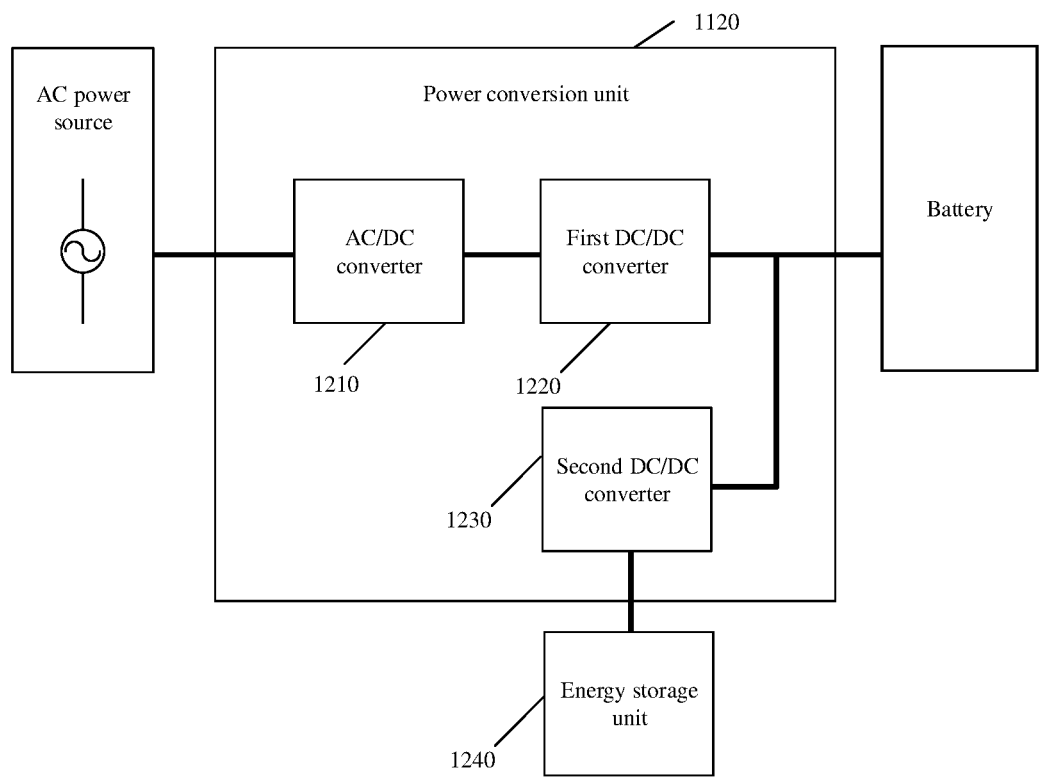
FIG. 13 is a schematic structural block diagram of a power conversion unit in a charging-and-discharging apparatus provided in an embodiment of the present application.

Alternatively, as shown in FIG. 13, the power conversion unit 1120 further includes a second DC/DC converter 1230. One end of the second DC/DC converter 1230 is connected between the first DC/DC converter 1220 and the battery and the other end of the second DC/DC converter 1230 is connected to an energy storage unit 1240.

In this case, the control unit 1110 can control the second DC/DC converter 1230 according to the first discharging request to discharge the power of the battery to the energy storage unit 1240.

Certainly, the power of the battery can also be simultaneously discharged to the AC power and the energy storage unit 1240. Specifically, the control unit 1110 controls the bidirectional AC/DC converter 1210 and the first DC/DC converter 1220 according to the first discharging current to discharge the power of the battery to an AC power, and controls the second DC/DC converter 1230 to simultaneously discharge the power of the battery to the energy storage unit 1240.

The energy storage unit 1240 can serve as a portion of the power conversion unit 1120 and can also serve as a unit independent of the power conversion unit 1120 and is connected to the power conversion unit 1120 through an electric wire. The energy storage unit 1240 for example can be an energy storage battery.

As shown in FIG. 12, Alternatively, the charging-and-discharging apparatus includes a bidirectional AC/DC converter 1210, a first DC/DC converter 1220 and a control unit 1110, and when the first DC/DC converter 1220 is a bidirectional DC/DC converter, the control unit 1110 is configured to: receive a first charging current sent by a BMS of a batter and control a bidirectional AC/DC converter 1210 and a first DC/DC converter 1220 according to the first charging current to charge a battery through an AC power, receive a first discharging current sent by the BMS and discharging a power of the battery according to the first discharging current, where the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and receive a second charging current sent by the BMS and controlling the AC/DC converter 1210 and the first DC/DC converter 1220 according to the second charging current to charge the battery through the AC power, where the second charging current is a charging current sent by the BMS when a first accumulative discharging amount of the battery is greater than or equal to a first accumulative discharging amount threshold.

It can be seen that in the process of charging the battery, the control unit charge and discharge the battery alternatively based on the first charging current and the first discharging current sent by the BMS by controlling the AC/DC converter and first DC/DC converter. Thus, heating, lithium-ion clustering and other problems caused by continuous charging of the battery can be avoided. Further, security problems of the battery caused by heating, lithium-ion clustering and other problems can be avoided, such as combustion or explosion of the battery, so as to ensure security performance of the battery.

Alternatively, the control unit 1110 is further configured to: receive a second discharging request sent by the BMS and discharge the power of the battery according to the second discharging request, where the second discharging current is a discharging current sent by the BMS when a second accumulative charging amount of the battery is greater than or equal to a second accumulative charging amount threshold and a voltage of a battery cell of the battery does not exceed a full-charging voltage of the battery cell.

Alternatively, the control unit 1110 is configured to receive a charging stop command sent by the BMS and stop charging the battery according to the charging stop command, where the charging stop command is a command sent by the BMS when a voltage of a battery cell of the battery exceeds a full-charging voltage of the battery cell.

As shown in FIG. 13, when the charging-and-discharging apparatus further includes a second DC/DC converter, alternatively, the control unit 1110 is specifically configured to: control the AC/DC converter 1210 and the first DC/DC converter 1220 according to the first discharging current to discharge the power of the battery to the AC power, and/or control the second DC/DC converter 1230 to simultaneously discharge the power of the battery to the energy storage unit 1240.

Alternatively, the control unit 1110 is specifically configured to: if a discharging demand power of the battery is greater than a maximum input power of the AC/DC converter 1210, control the AC/DC converter 1210 and the first DC/DC converter 1220 according to the first discharging current to discharge the power of the battery to the AC power; and control the second DC/DC converter 1230 to simultaneously discharge the power of the battery to the energy storage unit 1240.

A power of the battery for discharging to the AC power is equal to a maximum input power of the AC/DC converter 1210 for example; and a power of the battery for discharging to the energy storage unit 1240 is equal to a difference between a discharging demand power of the battery and a maximum input power of the AC/DC converter 1210 for example.

When the second DC/DC converter 1230 is a bidirectional DC/DC converter, the control unit 1110 is specifically configured to: if a SOC of the energy storage unit is greater than a SOC threshold, control the AC/DC converter 1210 and the first DC/DC converter 1220 according to the first charging current to charge the battery through the AC power; and control the second DC/DC converter 1230 to simultaneously charge the battery through the energy storage unit 1240.

A power of the energy storage unit 1240 for charging to the battery is equal to a maximum output power of the second DC/DC converter 1230 for example; and a power of the AC power for charging to the battery is equal to a difference between a charging demand power of the battery and a maximum output power of the second DC/DC converter 1230 for example.

Alternatively, the control unit 1110 is further configured to: if a discharging demand power of the battery is less than a maximum input power of the AC/DC converter 1210, control the AC/DC converter 1210 and the first DC/DC converter 1220 according to the first discharging current to discharge the power of the battery to the AC power.

Figure 14:
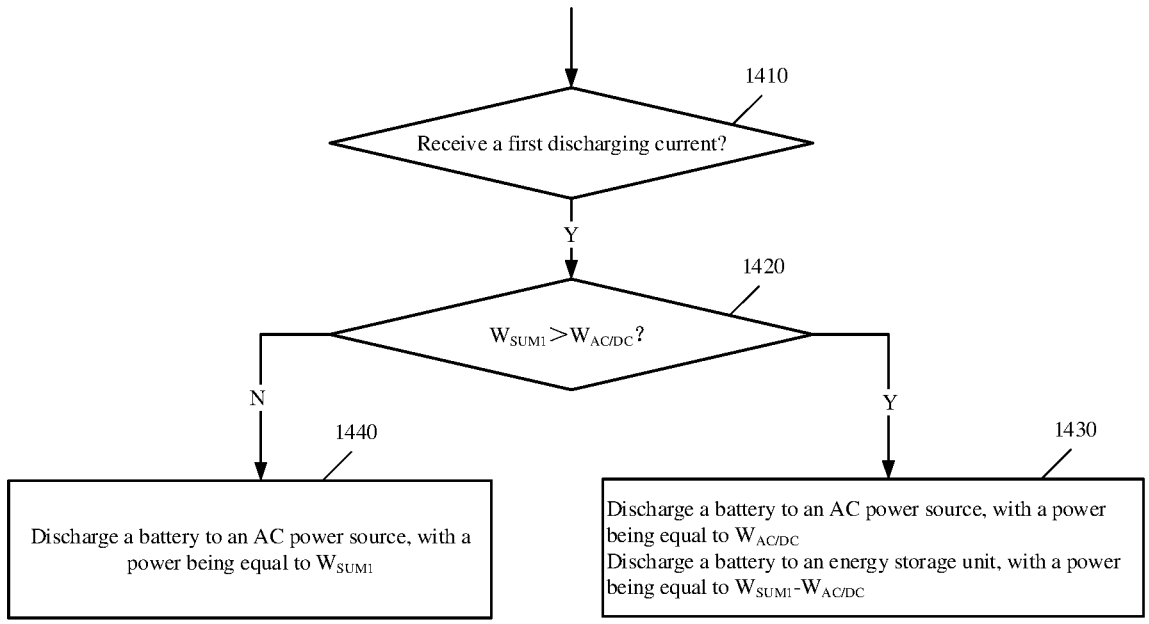
FIG. 14 is a schematic flow chart of a method for discharging a power of a battery based on a power conversion unit shown in FIG. 13.

The battery discharging process is described in details below by combining FIG. 14. In the procedure 1400 as shown in FIG. 14, the power conversion unit 1120 is controlled by the control unit 1110, to realize discharging of the battery, specifically including some or all of the following steps:

Step 1410: detecting whether a first discharging current sent by a BMS of a battery is received; and
performing step 1420 if the first discharging current sent by the BMS is received.

Step 1420: determining whether a discharging demand power $W_{SUM1}$ of the battery is greater than a maximum input power $W_{AC/DC}$ of a bidirectional AC/DC converter 1210.

The maximum input power $W_{AC/DC}$ of the bidirectional AC/DC converter 1210 can be determined for example based on a charging accepting ability of an AC power, that is, based on a maximum battery amount that is capable of being received by an AC power.

In step 1420, if a discharging demand power $W_{SUM1}$ of the battery is greater than a maximum input power $W_{AC/DC}$ of a bidirectional AC/DC converter 1210, performing step 1430; and if a discharging demand power $W_{SUM1}$ of the battery is less than a maximum input power $W_{AC/DC}$ of a bidirectional AC/DC converter 1210, performing step 1440.

Step 1430: controlling the bidirectional AC/DC converter 1210 and a first DC/DC converter 1220 according to the first discharging current to discharge a power of the battery to an AC power, and controlling a second DC/DC converter 1230 to simultaneously discharge the power of the battery to the energy storage unit 1240; and Step 1440: controlling the bidirectional AC/DC converter 1210 and the first DC/DC converter 1220 according to the first discharging current to discharge the power of the battery to the AC power.

That is, if a discharging demand power $W_{SUM1}$ of the battery is greater than a maximum input power $W_{AC/DC}$ of a bidirectional AC/DC converter 1210, the power of the battery is simultaneously discharged to the AC power and the energy storage unit 1240; and if a discharging demand power $W_{SUM1}$ of the battery is less than a maximum input power $W_{AC/DC}$ of a bidirectional AC/DC converter 1210, the power of the battery is only discharged to the AC power.

In step 1430, a power of the battery for discharging to the AC power can be equal to a maximum input power $W_{AC/DC}$ of the bidirectional AC/DC converter 1210 for example. At this time, a power of the battery for discharging to the energy storage unit 1240 can be equal to a difference between a discharging demand power $W_{SUM1}$ of the battery and a maximum input power $W_{AC/DC}$ of the bidirectional AC/DC converter 1210, that is, $W_{SUM1}-W_{AC/DC}$.

In step 1440, a power of the battery for discharging to the AC power can be determined based on the discharging demand power $W_{SUM1}$ of the battery for example.

The discharging demand power $W_{SUM1}$ can be determined based on the first discharging voltage and the first discharging current. When the battery has a discharging demand, the BMS of the battery will send the first discharging voltage and the first discharging current to the charging-and-discharging apparatus 1100.

Figure 15:
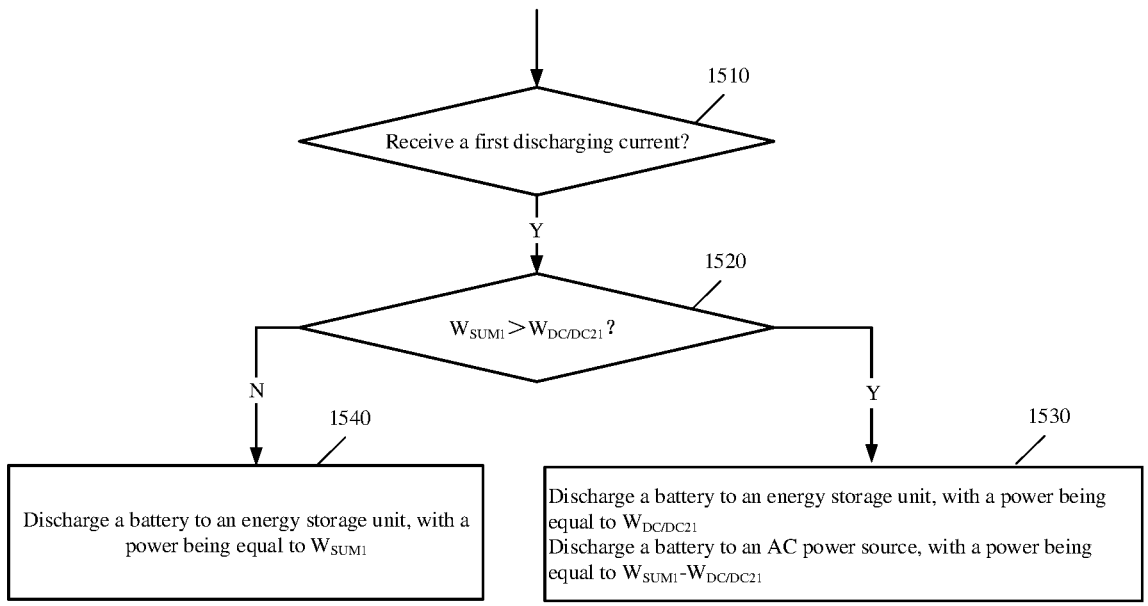
FIG. 15 is a schematic flow chart of a method for discharging a power of a battery based on a power conversion unit shown in FIG. 13.

Alternatively, the charging-and-discharging apparatus 1100 can also enable according to the procedure shown in FIG. 15 that the power conversion unit 1120 is controlled by the control unit 1110, to realize discharging of the battery, specifically including some or all of the following steps.

Step 1510: detecting whether a first discharging current sent by a BMS of a battery is received; and
performing step 1520 if the first discharging current sent by the BMS is received.

Step 1520: determining whether a discharging demand power $W_{SUM1}$ of the battery is greater than a maximum input power $W_{DC/DC21}$ of a second DC/DC converter 1230.

The maximum input power $W_{DC/DC21}$ of the second DC/DC converter 1230 can be determined for example based on a charging accepting ability of an energy storage unit 1240, that is, based on a maximum battery amount that is capable of being received by an energy storage unit 1240.

In step 1520, if a discharging demand power $W_{SUM1}$ of the battery is greater than a maximum input power $W_{DC/DC21}$ of the second AC/DC converter 1230, performing step 1530; and if a discharging demand power $W_{SUM1}$ of the battery is less than a maximum input power $W_{DC/DC21}$ of the second DC/DC converter 1230, performing step 1530.

Step 1530: controlling the second DC/DC converter 1230 according to the first discharging current to discharge a power of the battery to the energy storage unit 1240;

and controlling a bidirectional AC/DC converter 1210 and the first DC/DC converter 1220 to simultaneously discharge the power of the battery to the AC power.

Step 1540: controlling the second DC/DC converter 1230 according to the first discharging current to discharge the power of the battery to the energy storage unit 1240.

That is, if a discharging demand power $W_{SUM1}$ of the battery is greater than a maximum input power $W_{DC/DC21}$ of the second AC/DC converter 1230, the power of the battery is simultaneously discharged to the AC power and the energy storage unit 1240; and if a discharging demand power $W_{SUM1}$ of the battery is less than a maximum input power $W_{DC/DC21}$ of the second DC/DC converter 1230, the power of the battery is only discharged to the AC power.

In step 1530, a power of the battery for discharging to the energy storage unit 1240 can be equal to a maximum input power $W_{DC/DC21}$ of the second DC/DC converter 1230 for example. At this time, a power of the battery for discharging to the AC power can be equal to a difference between a discharging demand power $W_{SUM1}$ of the battery and a maximum input power $W_{DC/DC21}$ of the second DC/DC converter 1230, that is, $W_{SUM1}-W_{DC/DC21}$.

In step 1540, a power of the battery for discharging to the energy storage unit 1240 can be determined based on the discharging demand power $W_{SUM1}$ of the battery for example.

It can be seen that since the second DC/DC converter is additionally disposed and connected to an energy storage unit, the battery can discharge its power to an AC power and/or the energy storage unit, thereby improving an output capability of the charging-and-discharging apparatus, more effectively charging and discharging the battery alternatively and avoiding the problems of the battery such as heating, lithium ion aggregation, and the like, caused by continuous charging, and then avoiding the safety problems of the battery, such as battery combustion or explosion, caused by heating, lithium ion aggregation, and the like, so that the safety performance of the battery is guaranteed.

Moreover, the reasonable distribution of the power for discharging of the battery between the energy storage unit and the AC power is capable of effectively reducing unnecessary power consumption in the charging-and-discharging apparatus.

Figure 16:
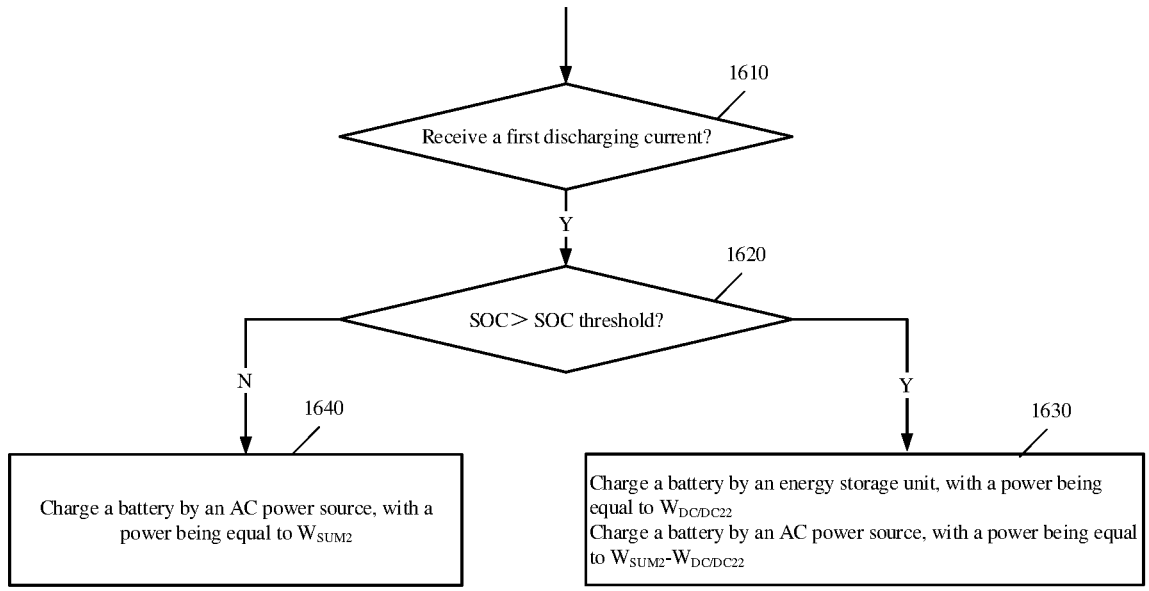
FIG. 16 is a schematic flow chart of a method for charging a battery based on a power conversion unit shown in FIG. 13.

When the second DC/DC converter 1230 is a bidirectional DC/DC converter, with the procedure 1600 as shown in FIG. 16, the energy storage unit 1240 can also be used for charging the battery. In addition to step 1410 to step 1440 or step 1510 to step 1540, the procedure 1600 shown in FIG. 16 further includes some or all of the following steps:

Step 1610: detecting whether a first charging current sent by a BMS of a battery is received; and performing step 1620 if the first charging current sent by the BMS is received.

Step 1620: determining whether a SOC of an energy storage unit 1240 is greater than a SOC threshold.

The SOC threshold can be set as 70% for example.

In step 1620, if the SOC of the energy storage unit 1240 is greater than the SOC threshold, performing step 1630; and if the SOC of the energy storage unit 1240 is less than the SOC threshold, performing step 1640.

Step 1630: controlling a bidirectional AC/DC converter 1210 and the first DC/DC converter 1220 according to the first charging current to charge the battery through the AC power; and controlling the second DC/DC converter 1230 to simultaneously charge the battery through the energy storage unit 1240.

Step 1640: controlling the bidirectional AC/DC converter 1210 and the first DC/DC converter 1220 according to the first charging current to charge the battery through the AC power.

That is, if the SOC of the energy storage unit 1240 is greater than the SOC threshold, the battery is charged simultaneously through the AC power and the energy storage unit 1240; and if the SOC of the energy storage unit 1240 is less than the SOC threshold, the energy storage unit 1240 is charged only through the AC power.

In step 1630, a power of the energy storage unit 1240 for charging to the battery can be equal to a maximum output power $W_{DC/DC22}$ of the second DC/DC converter 1230 for example. At this time, a power of the AC power for charging to the battery can be equal to a difference between a discharging demand power $W_{SUM2}$ of the battery and a maximum output power $W_{DC/DC22}$ of the second DC/DC converter 1230, that is, $W_{SUM2}-W_{DC/DC22}$.

In step 1640, a power of the AC power for charging to the battery can be equal to the discharging demand power $W_{SUM2}$ of the battery for example.

The charging demand power $W_{SUM2}$ can be determined based on the above first charging voltage and the above first charging current for example. When the battery has a charging demand, the BMS of the battery will send the first discharging voltage and the first charging current to the charging-and-discharging apparatus 1100.

It can be seen that since the second DC/DC converter 1230 is configured as a bidirectional DC/DC converter, the charging-and-discharging apparatus 1100 can determine whether to use the energy storage unit 1240 to assist the AC power to charge the battery together according to the SOC of the energy storage unit 1240, thereby improving charging efficiency of the charging-and-discharging apparatus 1100 when the power stored in the energy storage unit 1240 is sufficient.

Moreover, the reasonable distribution of the power for charging of the battery between the energy storage unit and the AC power is capable of effectively reducing unnecessary power consumption in the charging-and-discharging apparatus.

It should be understood that the procedures shown in FIG. 14 and FIG. 15 can be performed separately, that is, the energy storage unit 1240 is only used for receiving the power discharged by the battery. The procedure shown in FIG. 16 can be performed separately, that is, the energy storage unit 1240 is only used for charging the battery. The procedure shown in FIG. 16 and the procedure shown in FIG. 14 or FIG. 15 can also be performed in combination, that is, the energy storage unit 1240 can be used for both receiving the power discharged by the battery and charging the battery as well. This is not limited in the present application.

Figure 17:
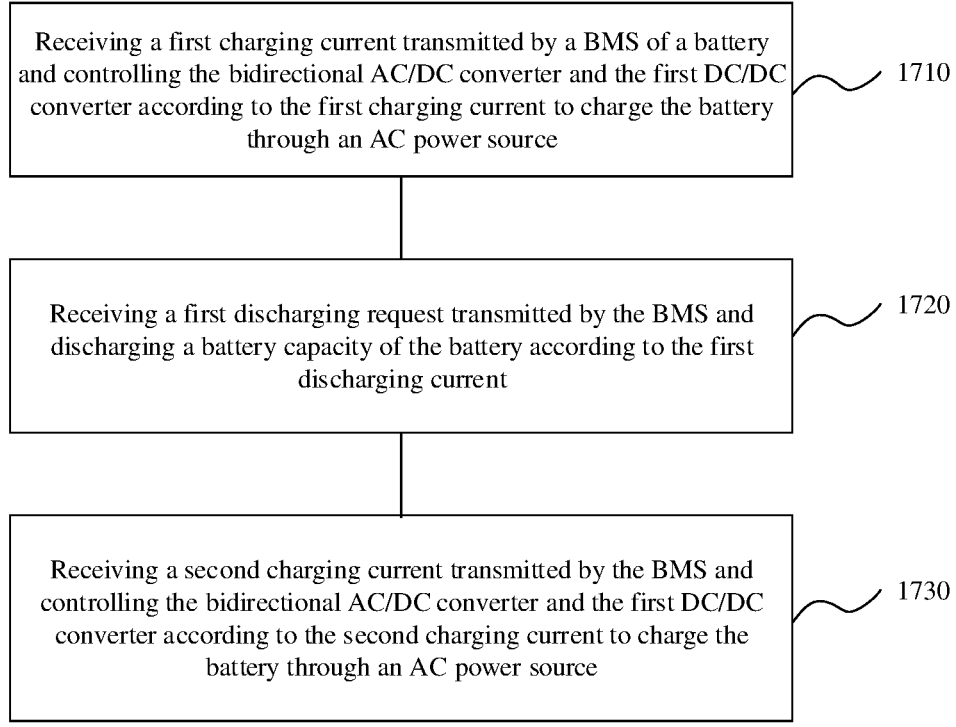
FIG. 17 is a schematic flowchart of a method for charging a battery provided by embodiments of the present application.

FIG. 17 shows a method for charging a battery 1700 provided by embodiments of the present application. The method 1700 can be applied to the charging-and-discharging apparatus having the power conversion unit 1120 shown in FIG. 12 or FIG. 13. The charging-and-discharging apparatus includes a bidirectional AC/DC converter, a first DC/DC converter, and a control unit, where the first DC/DC converter is a bidirectional DC/DC converter; As shown in FIG. 17, the method includes:

step 1710: receiving a first charging current sent by a BMS of a battery and controlling a bidirectional AC/DC converter and a first DC/DC converter according to the first charging current to charge the battery through an AC power;

step 1720: receiving a first discharging current sent by the BMS and discharging a power of the battery according to the first discharging current, where the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and step 1730: receiving a second charging current sent by the BMS and controlling the bidirectional AC/DC converter and the first DC/DC converter according to the second charging current to charge the battery through the AC power, where the second charging current is a charging current sent by the BMS when a first accumulative discharging amount of the battery is greater than or equal to a first accumulative discharging amount threshold.

Based on the technical solution, in the process of charging the battery, the control unit charge and discharge the battery alternatively based on the first charging current and the first discharging current sent by the BMS by controlling the AC/DC converter and first DC/DC converter. Thus, heating, lithium-ion clustering and other problems caused by continuous charging of the battery can be avoided. Further, security problems of the battery caused by heating, lithium-ion clustering and other problems can be avoided, such as combustion or explosion of the battery, so as to ensure security performance of the battery.

Alternatively, the method further includes: receiving a second discharging current sent by the BMS and discharging the power of the battery according to the second discharging current, where the second discharging current is a discharging current sent by the BMS when a second accumulative charging amount of the battery is greater than or equal to a second accumulative charging amount threshold and a voltage of a battery cell of the battery does not exceed a full-charging voltage of the battery cell.

Alternatively, the method further includes: receiving a charging stop command sent by the BMS and stopping charging the battery according to the charging stop command, where the charging stop command is a command sent by the BMS when a voltage of a battery cell of the battery exceeds a full-charging voltage of the battery cell.

Alternatively, the charging-and-discharging apparatus further includes a second DC/DC converter, one end of the second DC/DC converter is connected between the first DC/DC converter and the battery and the other end of the second DC/DC converter is connected to an energy storage unit; where the discharging a power of the battery according to the first discharging current includes: controlling the bidirectional AC/DC converter and the first DC/DC converter according to the first discharging request to discharge the power of the battery to the AC power; and controlling the second DC/DC converter to simultaneously discharge power of the battery to the energy storage unit.

Alternatively, the controlling the bidirectional AC/DC converter and the first DC/DC converter according to the first discharging request to discharge the power of the battery to the AC power and controlling the second DC/DC converter to simultaneously discharge the power of the battery to the energy storage unit, includes: if a discharging demand power of the battery is greater than a maximum input power of the bidirectional AC/DC converter, controlling the bidirectional AC/DC converter and the first DC/DC converter according to the first discharging current to discharge the power of the battery to the AC power; and controlling the second DC/DC converter to simultaneously discharge the power of the battery to the energy storage unit.

Alternatively, a power of the battery for discharging to the AC power is equal to a maximum input power of the bidirectional AC/DC converter and a power of the battery for discharging to the energy storage unit is equal to a difference between a discharging demand power of the battery and a maximum input power of the bidirectional AC/DC converter.

Alternatively, the second DC/DC converter is a bidirectional DC/DC converter, where the controlling the bidirectional AC/DC converter and the first DC/DC converter according to the first charging current to charge the battery through the AC power, includes: if the SOC of the energy storage unit is greater than a SOC threshold, controlling the bidirectional AC/DC converter and the first DC/DC converter according to the first charging current to charge the battery through the AC power; and controlling the second DC/DC converter to simultaneously charge the battery through the energy storage unit.

Alternatively, a power of the energy storage unit for charging to the battery is a maximum output power of the second DC/DC converter; and a power of the AC power for charging to the battery is a difference between a charging demand power of the battery and a maximum output power of the second DC/DC converter.

Alternatively, the method further includes: if a discharging demand power of the battery is less than a maximum input power of the bidirectional AC/DC converter, controlling the bidirectional AC/DC converter and the first DC/DC converter according to the first discharging current to discharge the power of the battery to the AC power.

Alternatively, the AC power includes but is not limited to a power grid, which may be configured to provide a three-phase alternating current, the power grid may provide enough electric amount to the battery for charging as well as receive a higher electric amount released by the battery.

Alternatively, in other embodiments, the AC power may also be a single-phase AC power. The embodiments of the present application have no limitation on the specific type of the AC power.

It should be noted that in the embodiments of the present application, the power conversion unit 1120 may be connected to a DC power in addition to an AC power as shown in FIG. 12, where only a DC/DC converter may be included in the power conversion unit 1120 to enable current transfer between the battery and the DC power.

Figure 18:
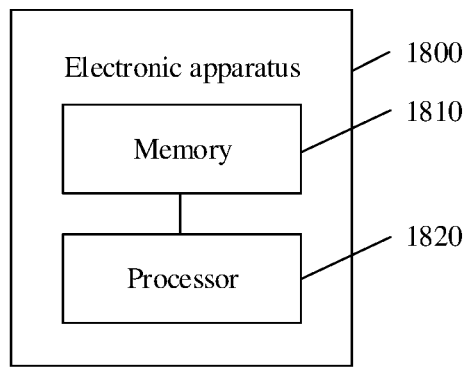
FIG. 18 is a schematic structural block diagram of an electronic apparatus in an embodiment of the present application.

FIG. 18 shows a schematic structural block diagram of an electronic apparatus 1800 in one embodiment of the present application. As shown in FIG. 18, the electronic apparatus 1800 includes a memory 1810 and a processor 1820, where the memory 1810 is configured to store a computer program and the processor 1820 is configured to read the computer program and execute the methods in above various embodiments of the present application based on the computer program.

Alternatively, the electronic apparatus 1800 can be used for any one or more of the BMS and the charging-and-discharging apparatus. In embodiments of the present application, in addition to the fact that the processor in the charging-and-discharging apparatus reads the corresponding computer program and executes the charging method corresponding to the charging-and-discharging apparatus in the various embodiments based on the computer program, the processor in the BMS may also read the corresponding computer program and execute the charging method corresponding to the BMS in the various embodiments based on the computer program.

In addition, the embodiments of the present application further provide a readable storage medium for storing a computer program, where the computer program is configured to execute the method in the various embodiments of the present application. Alternatively, the computer program may be a computer program in the charging-and-discharging apparatus and/or BMS.

It should be understood that the specific examples herein are intended merely to aid those skilled in the art in better understanding the embodiments of the present application and are not intended to limit the scope of the embodiments of the present application.

It further should be understood that in the various embodiments of the present application, the serial number of each process does not mean the sequence of execution, and the execution sequence of each process should be determined by the function and the internal logic, and should not limit the implementation process of the embodiments of the present application.

It is also to be understood that the various embodiments described in this specification may be implemented separately or in combination, to which the embodiments of the present application have no limitation.

While the present application has been described with reference to some embodiments, various modifications may be made thereto and equivalents may be substituted for components thereof without departing from the scope of the present application. In particular, the various technical features mentioned in various embodiments may be combined in any way as long as no structural conflict exists. The present application is not limited to the particular embodiments disclosed herein, but includes all technical solutions falling within the scope of the claims.

What is claimed is:

1. A charging-and-discharging apparatus, comprising a bidirectional alternating current/direct current (AC/DC) converter, a first direct current/direct current (DC/DC) converter, and a control unit, wherein the first DC/DC converter is a bidirectional DC/DC converter;

wherein the control unit is configured to:

receive a first charging current, a first discharging current and a second charging current sent by a battery management system (BMS) of a battery in sequence, wherein when the first charging current is received, control the bidirectional AC/DC converter and the first DC/DC converter according to the first charging current to charge the battery through an AC power;

when the first discharging current is received, discharge a power of the battery according to the first discharging current, wherein the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and when the second charging current is received, control the bidirectional AC/DC converter and the first DC/DC converter according to the second charging current to charge the battery through the AC power, wherein the second charging current is a charging current sent by the BMS when a first accumulative discharging amount of the battery is greater than or equal to a first accumulative discharging amount threshold;

wherein the charging-and-discharging apparatus further comprises a second DC/DC converter, one end of the second DC/DC converter is connected between the first DC/DC converter, and the battery and the other end of the second DC/DC converter is connected to an energy storage unit; and wherein the control unit is specifically configured to:

control the bidirectional AC/DC converter and the first DC/DC converter according to the first discharging current to discharge the power of the battery to the AC power; and control the second DC/DC converter to simultaneously discharge the power of the battery to the energy storage unit.

2. The charging-and-discharging apparatus according to claim 1, wherein the control unit is specifically used for:

when a discharging demand power of the battery is greater than a maximum input power of the bidirectional AC/DC converter, control the bidirectional AC/DC converter and the first DC/DC converter according to the first discharging current to discharge the power of the battery to the AC power; and control the second DC/DC converter to simultaneously discharge the power of the battery to the energy storage unit.

3. The charging-and-discharging apparatus according to claim 1, wherein a power of the battery for discharging to the AC power is equal to a maximum input power of the bidirectional AC/DC converter; and a power of the battery for discharging to the energy storage unit is equal to a difference between a discharging demand power of the battery and a maximum input power of the bidirectional AC/DC converter.

4. The charging-and-discharging apparatus according to claim 1, wherein the control unit is further configured to:

when a discharging demand power of the battery is less than a maximum input power of the bidirectional AC/DC converter, control the bidirectional AC/DC converter and the first DC/DC converter according to the first discharging current to discharge the power of the battery to the AC power.

5. The charging-and-discharging apparatus according to claim 1, wherein the control unit is specifically configured to:

regularly receive the first charging current sent by the BMS; and/or regularly receive the first discharging current sent by the BMS; and/or regularly receive the second charging current sent by the BMS.

6. The charging-and-discharging apparatus according to claim 1, wherein the control unit is further configured to:

receive a first charging voltage sent by the BMS, wherein the first charging voltage and the first charging current are carried in a first battery charging demand message; and/or receive a first discharging voltage sent by the BMS, wherein the first discharging voltage and the first discharging current are carried in a second battery charging demand message; and/or receive a second charging voltage sent by the BMS, wherein the second charging voltage and the second charging current are carried in a third battery charging demand message.

7. The charging-and-discharging apparatus according to claim 1, wherein the second DC/DC converter is a bidirectional DC/DC converter, and the control unit is specifically configured to:
when a SOC of the energy storage unit is greater than a SOC threshold, control the bidirectional AC/DC converter and the first DC/DC converter according to the first charging current to charge the battery through the AC power; and
control the second DC/DC converter to simultaneously charge the battery through the energy storage unit.

8. The charging-and-discharging apparatus according to claim 7, wherein
a power of the energy storage unit for charging to the battery is a maximum output power of the second DC/DC converter;
a power of the AC power for charging to the battery is a difference between a charging demand power of the battery and a maximum output power of the second DC/DC converter.

9. A method for charging a battery, being applied to a charging-and-discharging apparatus, the charging-and-discharging apparatus comprising a bidirectional alternating current/direct current (AC/DC) converter, a first direct current/direct current (DC/DC) converter, and a control unit, wherein the first DC/DC converter is a bidirectional DC/DC converter;
wherein the method comprises:
receiving a first charging current, a first discharging current and a second charging current sent by a battery management system (BMS) of a battery in sequence, wherein
when the first charging current is received, controlling the bidirectional AC/DC converter and the first DC/DC converter according to the first charging current to charge the battery through an AC power;
when the first discharging current is received, discharging a power of the battery according to the first discharging current, wherein the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and
when the second charging current is received, controlling the bidirectional AC/DC converter and the first DC/DC converter according to the second charging current to charge the battery through the AC power, wherein the second charging current is a charging current sent by the BMS when a first accumulative discharging amount of the battery is greater than or equal to a first accumulative discharging amount threshold;
wherein the charging-and-discharging apparatus further comprises a second DC/DC converter, one end of the second DC/DC converter is connected between the first DC/DC converter, and the battery and the other end of the second DC/DC converter is connected to an energy storage unit; and
wherein the discharging the power of the battery according to the first discharging current comprises:
controlling the bidirectional AC/DC converter and the first DC/DC converter according to the first discharging current to discharge the power of the battery to the AC power; and
controlling the second DC/DC converter to simultaneously discharge the power of the battery to the energy storage unit.

10. The method according to claim 9, wherein the controlling the bidirectional AC/DC converter and the first DC/DC converter according to the first discharging current to discharge the power of the battery to the AC power, and controlling the second DC/DC converter to simultaneously discharge the power of the battery to the energy storage unit comprises:
when a discharging demand power of the battery is greater than a maximum input power of the bidirectional AC/DC converter, controlling the bidirectional AC/DC converter and the first DC/DC converter according to the first discharging current to discharge the power of the battery to the AC power; and
controlling the second DC/DC converter to simultaneously discharge the power of the battery to the energy storage unit.

11. The method according to claim 9, wherein
a power of the battery for discharging to the AC power is equal to a maximum input power of the bidirectional AC/DC converter; and
a power of the battery for discharging to the energy storage unit is equal to a difference between a discharging demand power of the battery and a maximum input power of the bidirectional AC/DC converter.

12. The method according to claim 9, wherein the method further comprises:
when a discharging demand power of the battery is less than a maximum input power of the bidirectional AC/DC converter, controlling the bidirectional AC/DC converter and the first DC/DC converter according to the first discharging current to discharge the power of the battery to the AC power.

13. The method according to claim 9, wherein
the receiving the first charging current sent by the BMS of the battery comprises:
regularly receiving the first charging current sent by the BMS; and/or
the receiving the first discharging current sent by the BMS comprises:
regularly receiving the first discharging current sent by the BMS; and/or
the receiving the second charging current sent by the BMS comprises:
regularly receiving the second charging current sent by the BMS.

14. The method according to claim 9, wherein the method further comprises:
receiving a first charging voltage sent by the BMS, wherein the first charging voltage and the first charging current are carried in a first battery charging demand message; and/or
receiving a first discharging voltage sent by the BMS, wherein the first discharging voltage and the first discharging current are carried in a second battery charging demand message; and/or
receiving a second charging voltage sent by the BMS, wherein the second charging voltage and the second charging current are carried in a third battery charging demand message.

15. The method according to claim 9, wherein the second DC/DC converter is a bidirectional DC/DC converter;
wherein the controlling the bidirectional AC/DC converter and the first DC/DC converter according to the first charging current, to charge the battery through an AC power comprises:
when a SOC of the energy storage unit is greater than a SOC threshold, controlling the bidirectional AC/DC converter and the first DC/DC converter according to the first charging current to charge the battery through the AC power; and controlling the second DC/DC converter to simultaneously charge the battery through the energy storage unit.

16. The method according to claim 15, wherein
a power of the energy storage unit for charging to the battery is a maximum output power of the second DC/DC converter;
a power of the AC power for charging to the battery is a difference between a charging demand power of the battery and a maximum output power of the second DC/DC converter.

17. A charging-and-discharging apparatus, comprising a processor and a memory, wherein the memory is configured to store a computer program, and the processor is configured to call the computer program to perform a method for charging a battery, the method is applied to a charging-and-discharging apparatus, the charging-and-discharging apparatus comprising a bidirectional alternating current/direct current (AC/DC) converter, a first direct current/direct current (DC/DC) converter, and a control unit, wherein the first DC/DC converter is a bidirectional DC/DC converter;
wherein the method comprises:
receiving a first charging current, a first discharging current and a second charging current sent by a battery management system (BMS) of a battery in sequence, wherein
when the first charging current is received, controlling the bidirectional AC/DC converter and the first DC/DC converter according to the first charging current to charge the battery through an AC power;
when the first discharging current is received, discharging a power of the battery according to the first discharging current, wherein the first discharging current is a discharging current sent by the BMS when a first accumulative charging amount of the battery is greater than or equal to a first accumulative charging amount threshold and a voltage of a battery cell of the battery does not exceed a full-charging voltage of the battery cell; and
when the second charging current is received, controlling the bidirectional AC/DC converter and the first DC/DC converter according to the second charging current to charge the battery through the AC power, wherein the second charging current is a charging current sent by the BMS when a first accumulative discharging amount of the battery is greater than or equal to a first accumulative discharging amount threshold;
wherein the charging-and-discharging apparatus further comprises a second DC/DC converter, one end of the second DC/DC converter is connected between the first DC/DC converter, and the battery and the other end of the second DC/DC converter is connected to an energy storage unit; and
wherein the discharging the power of the battery according to the first discharging current comprises:
controlling the bidirectional AC/DC converter and the first DC/DC converter according to the first discharging current to discharge the power of the battery to the AC power; and
controlling the second DC/DC converter to simultaneously discharge the power of the battery to the energy storage unit.

* * * * *